United States Patent
Yenisetty et al.

(10) Patent No.: US 10,909,616 B2
(45) Date of Patent: *Feb. 2, 2021

(54) PROBABILITY MODELING

(71) Applicant: eBay Inc., San Jose, CA (US)

(72) Inventors: Harita Yenisetty, Sunnyvale, CA (US); Prashanth Patlolla, San Jose, CA (US); Bhavani Kumar Hari, Campbell, CA (US); Gayathri Ravichandran Geetha, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/109,949

(22) Filed: Aug. 23, 2018

(65) Prior Publication Data
US 2018/0374149 A1 Dec. 27, 2018

Related U.S. Application Data

(63) Continuation of application No. 14/818,056, filed on Aug. 4, 2015, now Pat. No. 10,068,286.

(51) Int. Cl.
*G06Q 30/00* (2012.01)
*G06Q 30/08* (2012.01)
*G06Q 30/02* (2012.01)

(52) U.S. Cl.
CPC ......... *G06Q 30/08* (2013.01); *G06Q 30/0275* (2013.01)

(58) Field of Classification Search
None
See application file for complete search history.

(56) References Cited

U.S. PATENT DOCUMENTS

| | | |
|---|---|---|
| 7,493,273 B1 | 2/2009 | Devlin et al. |
| 7,801,798 B1 | 9/2010 | Huemer et al. |
| 8,145,541 B2 | 3/2012 | Mohan |
| 8,266,009 B1 | 9/2012 | Devlin et al. |
| 8,463,665 B1 | 6/2013 | Pape et al. |
| 8,601,373 B1 * | 12/2013 | Ackley .............. G06Q 30/0601 715/718 |
| 9,727,616 B2 | 8/2017 | Wu et al. |
| 10,068,249 B1 | 9/2018 | Wei et al. |
| 10,068,286 B2 | 9/2018 | Yenisetty et al. |
| 10,453,119 B2 | 10/2019 | Yenisetty et al. |
| 2005/0091140 A1 | 4/2005 | Sloan |

(Continued)

OTHER PUBLICATIONS

"U.S. Appl. No. 14/818,056, Non Final Office Action dated Oct. 11, 2017", 10 pgs.

(Continued)

*Primary Examiner* — Mila Airapetian
(74) *Attorney, Agent, or Firm* — Schwegman Lundberg & Woessner, P.A.

(57) ABSTRACT

In various example embodiments, a system and method for providing dynamic bidding notifications and price guidance for buyers are presented. The system receives a selection of a present item listing and accesses historical auction data for a set of historical item listings. The system generates a dynamic bidding model for bidding on the present item and generates one or more bidding notifications based on the dynamic bidding model. The system then causes presentation of the one or more bidding notifications on a client device.

20 Claims, 17 Drawing Sheets

(56) References Cited

U.S. PATENT DOCUMENTS

| | | | |
|---|---|---|---|
| 2005/0177443 | A1 | 8/2005 | Rodriguez et al. |
| 2007/0130090 | A1 | 6/2007 | Staib et al. |
| 2007/0143171 | A1 | 6/2007 | Boyd et al. |
| 2008/0147566 | A1 | 6/2008 | Malik |
| 2009/0157522 | A1 | 6/2009 | Srinivasan et al. |
| 2011/0004509 | A1 | 1/2011 | Wu et al. |
| 2011/0106641 | A1 | 5/2011 | Vogel et al. |
| 2012/0158748 | A1 | 6/2012 | Smintina et al. |
| 2013/0073410 | A1 | 3/2013 | Bhogal et al. |
| 2013/0073413 | A1 | 3/2013 | Bhogal et al. |
| 2015/0058150 | A1 | 2/2015 | Gura et al. |
| 2015/0161635 | A1 | 6/2015 | Yuan et al. |
| 2016/0291807 | A1* | 10/2016 | Chong .................. G06Q 30/08 |
| 2017/0039633 | A1 | 2/2017 | Yenisetty et al. |
| 2017/0039634 | A1 | 2/2017 | Yenisetty et al. |
| 2020/0051162 | A1 | 2/2020 | Yenisetty et al. |

OTHER PUBLICATIONS

"U.S. Appl. No. 14/818,056, Response filed Apr. 9, 2018 to Non Final Office Action dated Oct. 11, 2017", 16 pgs.

"U.S. Appl. No. 14/818,056, Notice of Allowance dated May 7, 2018", 7 pgs.

"U.S. Appl. No. 14/818,056, Notice of Allowability dated May 30, 2018", 13 pgs.

"Applicant Initiated Interview Summary received for U.S. Appl. No. 14/818,066, dated Aug. 15, 2018", (dated Aug. 15, 2018), 5 pages.

"Applicant Initiated Interview Summary received for U.S. Appl. No. 14/818,066, dated Mar. 14, 2018", (dated Mar. 14, 2018), 3 pages.

"Final Office Action received for U.S. Appl. No. 14/818,066, dated Sep. 27, 2018", (dated Sep. 27, 2018), 27 pages.

"Non-Final Office Action received for U.S. Appl. No. 14/818,066, dated May 11, 2018", (dated May 11, 2018), 15 pages.

"Response to Non-Final Office Action filed on Aug. 13, 2018, for U.S. Appl. No. 14/818,066, dated May 11, 2018", (dated Aug. 13, 2018), 20 pages.

"Response to Restriction Requirement filed on Mar. 20, 2018 for U.S. Appl. No. 14/818,066, dated Jan. 24, 2018", (dated Mar. 20, 2018), 12 pages.

"Restriction Requirement received for U.S. Appl. No. 14/818,066, dated Jan. 24, 2018", (dated Jan. 24, 2018), 6 pags.

"Dynamic Profiling of Online Auctions Using Curve Clustering", (Sep. 13, 2003), 29 pages Advisory Action received for U.S. Appl. No. 14/818,066, dated Mar. 7, 2019, 3 pages.

Final Office Action Received for U.S. Appl. No. 14/818,066 dated Dec. 20, 2018, 26 pages.

Response to Final Office Action filed on Feb. 20, 2019, for U.S. Appl. No. 14/818,066, dated Dec. 20, 2018, 26 pages.

Response to Final Office Action filed on Nov. 30, 2018, for U.S. Appl. No. 14/818,066, dated Sep. 27, 2018, 24 pages.

Notice of Allowance received for U.S. Appl. No. 14/818,066, dated Jun. 10, 2019, 10 pages.

Response to Final Office Action and Advisory Action filed on Mar. 20, 2019 for U.S. Appl. No. 14/818,066, dated Dec. 20, 2018 and dated Mar. 7, 2019, 25 pages.

\* cited by examiner

PROBABILITY MODELING

CLAIM OF PRIORITY

This Application is a Continuation of U.S. application Ser. No. 14/818,056, filed Aug. 4, 2015, which is hereby incorporated by reference in its entirety.

TECHNICAL FIELD

Embodiments of the present disclosure relate generally to multi-user network communications during interactive events and, more particularly, but not by way of limitation, to providing real time guidance to users participating in networked interactions.

BACKGROUND

Conventionally, estimating prices for auction items is generally performed by analyzing the average of previous prices paid for comparable items. However, it is often difficult to estimate the price for unique items in live auctions due to the lack of comparable items. As a result, sellers of unique items are often hesitant to utilize live auctions for selling items because of uncertainty related to the eventual selling price of the item.

Live auctions proceed at a fast and often irregular pace. Bidding times on items sold at live auctions may vary based on competition between potential buyers, interest in the item, speed of the auctioneer, the number of potential buyers, and other factors. Because of the uncertainty in timing for when bidding may commence on a specific item, buyers interested in a single item, among a large set of items being sold at a live auction, may feel compelled to sit through the live auction until the item of interest comes up for bid. Further, due to the fast and irregular pacing of live auctions, users often lose out on successfully bidding on an item, particularly those buyers using proxy or absentee bids.

BRIEF DESCRIPTION OF THE DRAWINGS

Various ones of the appended drawings merely illustrate example embodiments of the present disclosure and cannot be considered as limiting its scope.

Figure 1:
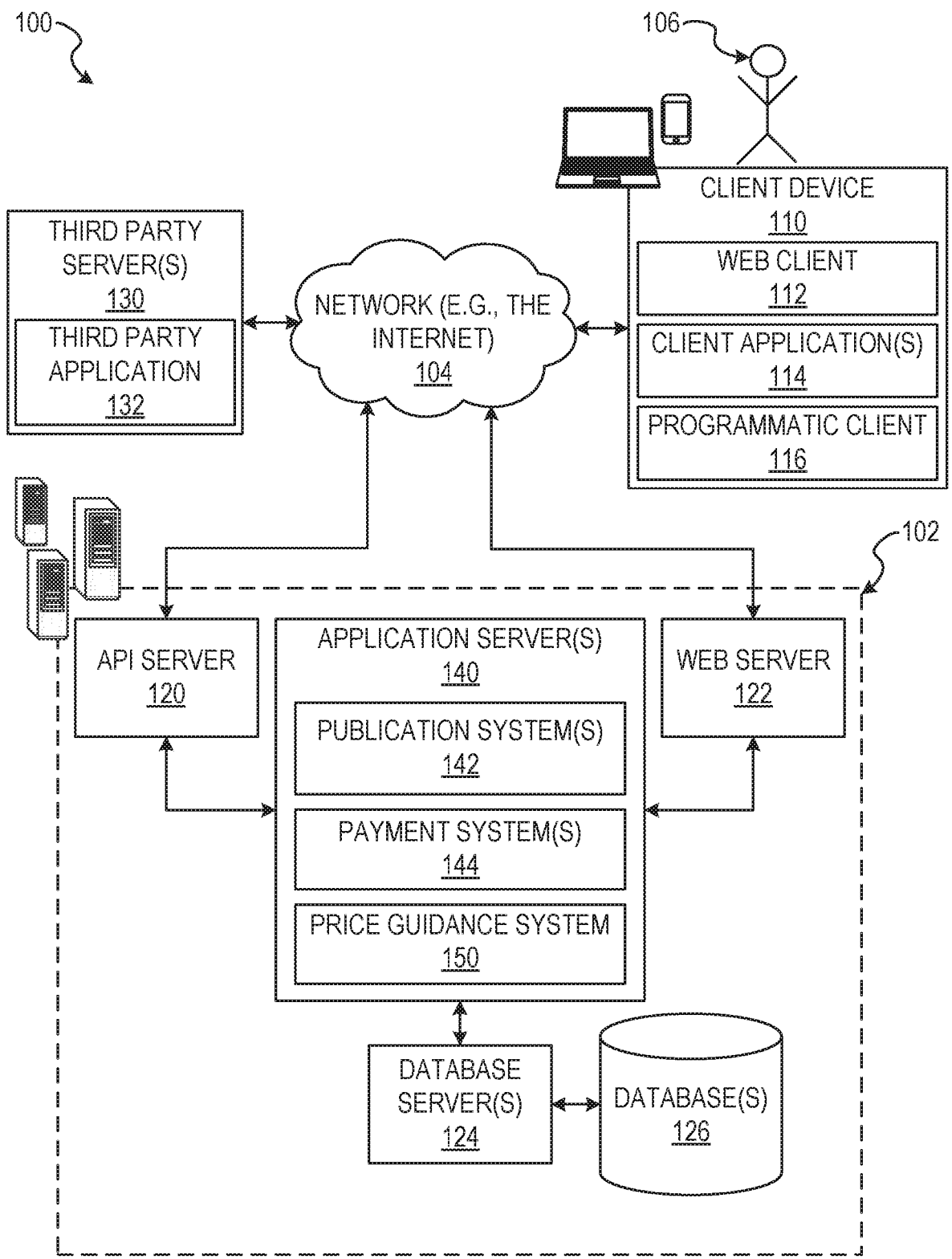
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, methods and systems providing time sensitive guidance for users participating in interactive events across a communications network. In some example embodiments the methods and systems comprise a price guidance system. The price guidance system accesses historical item listings to determine bid velocities and the interrelation of bid velocities to characteristics of the historical item listings. The price guidance system generates a price guidance model for a present item based on the historical item listings and the bid velocity data of the historical item listings and generates suggested prices for the present item or an estimated closing price for the present item.

The price guidance system also generates bidding notifications for a potential buyer of an item posted for sale in an auction. The price guidance system accesses historical auction data and associated bid velocity data for the historical auctions. The price guidance system generates a dynamic bidding model and generates the bidding notifications. In some embodiments, the bidding notifications include indications of estimated starting times for a particular item within a larger live auction, estimations of whether and when the potential buyer's proxy bid will be exceeded, and estimations of a maximum proxy bid likely to successfully close bidding on the item of interest to the potential buyer. In some embodiments, once the price guidance system has estimated the potential buyer will be outbid, the price guidance system may determine timing and amounts of proxy bids, within a maximum proxy bid value, likely to provide the potential buyer with a successful bid on the item of interest.

Bid velocity data can be understood as a rate at which bids are received during an auction. For example, in some embodiments, bid rate can be calculated by dividing a total number of bids within a given time period by the number of a set of time intervals (e.g., 10 second intervals) within the time period. The auction during which the bids are received may be a live auction, a timed auction, or any other suitable auction for an item. In addition to the rate at which bids are received, bid velocity data includes amounts of bids being placed on an item. As such, the bid velocity data can provide insight into bidding on an item with regard to price ranges, bidding habits of a potential buyer, competitiveness of prices for a given item, and other aspects of item auctions and bidding related to timing, frequency, and amounts of bids.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but is not limited to, a mobile phone, desktop computer, laptop, portable digital assistant (PDA), smart phone, tablet, ultra book, netbook, laptop, multi-processor system, microprocessor-based or programmable consumer electronics, game console, set-top boxe, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (W AN), a metropolitan area network (MAN), a portion of the Internet, a portion of the public switched telephone network (PSTN), a cellular telephone network, a wireless network, a WiFi network, a WiMax network, another type of network, or a combination of two or more such networks.

Each of the client device 110 may include one or more applications 114 (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application 114 is configured to locally provide the user interface and at least some of the functionalities with the application 114 configured to communicate with the networked system 102, on an as needed basis, for data and/or processing capabilities not locally available (e.g., access to a database of items available for sale, to authenticate a user 106, to verify a method of payment, etc.). Conversely, if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The price guidance system 150 may provide functionality operable to perform various price guidance, bidding, and notification functions using a present item listing, a set of historical item listings, and bid velocity data for the set of historical item listings. For example, the price guidance system 150 accesses the present item listing and one or more of the set of historical item listings from the databases 126, the third party servers 130, the publication system 142, the client device 110, and other sources. In some example embodiments, the price guidance system 150 analyzes the bid velocity data to generate a price guidance model for a present item listing, pricing suggestions for a seller of the present item listing, generates notifications indicative of a total expected revenue for a set of item listings of the seller, a dynamic bidding model for a potential buyer of the present item listing, proxy bidding for the potential buyer of the present item listing, warning notifications indicative of a likelihood of a maximum proxy bid value of the potential buyer being exceeded, and notifications indicating an estimated time that an item listing in a live auction will commence bidding. As more historical item listings are added to a category, a sub-category, or have descriptions similar to the present item, the price guidance system 150 can further refine price guidance models and dynamic bidding models for subsequent item listings. In some example embodiments, the price guidance system 150 communicates with the publication systems 142 (e.g., accessing item listings) and payment systems 144 (e.g. completing proxy bidding functions). In an alternative embodiment, the price guidance system 150 may be a part of the publication system 142.

Further, while the client-server-based network architecture 100 shown in FIG. 1 employs a client-server architecture, the present inventive subject matter is, of course, not limited to such an architecture, and could equally well find application in a distributed, or peer-to-peer, architecture system, for example. The various publication system 142, payment system 144, and price guidance system 150 could also be implemented as standalone systems without having networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
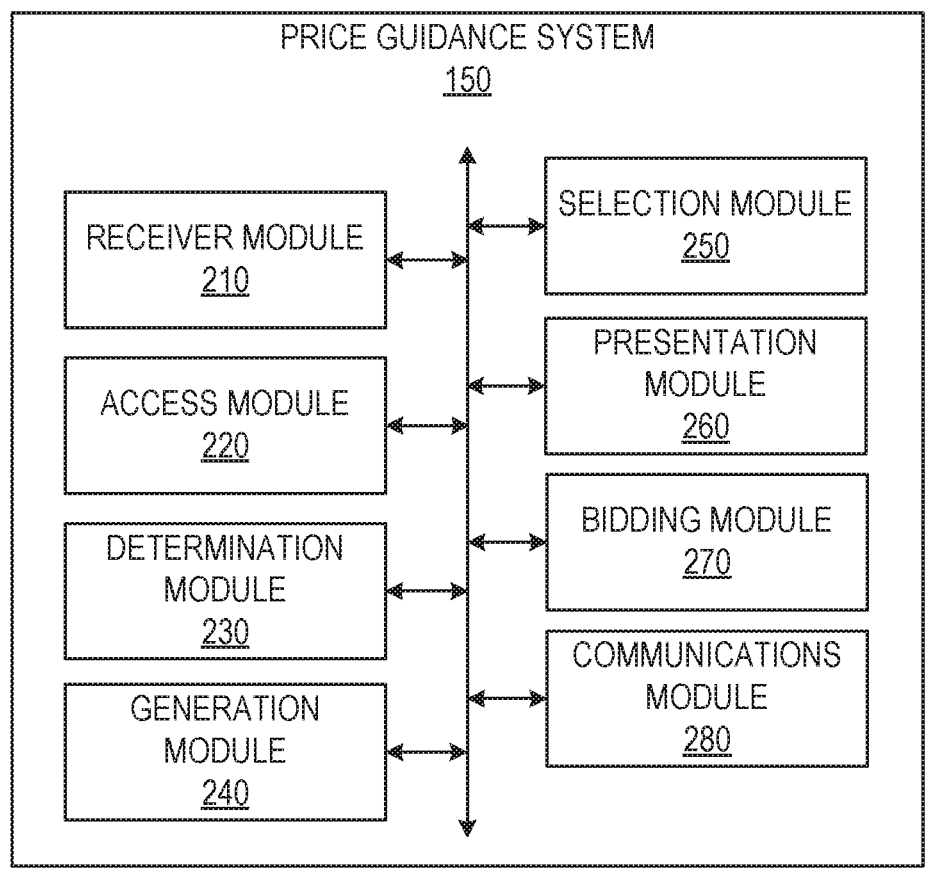
FIG. 2 is a block diagram of an example price guidance system, according to various embodiments.

FIG. 2 is a block diagram illustrating components of the price guidance system 150, according to some example embodiments. The price guidance system 150 is shown as including a receiver module 210, an access module 220, a determination module 230, a generation module 240, a selection module 250, a presentation module 260, a bidding module 270, and a communication module 280 all configured to communicate with one another (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform operations for which that module is designed. Moreover, any two or more of these modules may be combined into a single module, and the functions described herein for a single module may be subdivided among multiple modules. Furthermore, according to various example embodiments, modules described herein as being implemented within a single machine, database(s) 126, or device (e.g., client device 110) may be distributed across multiple machines, database(s) 126, or devices.

The receiver module 210 receives a present item listing indicative of a present item. The present item listing may be received as one or more portions of data indicative of a present item. As described below in more detail, the present item listing may include item characteristics, listing characteristics, auction characteristics, and other information suitable to describe the present item for sale using the publication system 142 or another system. The receiver module 210 can be a hardware implemented module or a hardware-software implemented module. An example embodiment of components of the receiver module 210 is described below with respect to the section entitled "Modules, Components, and Logic."

The receiver module 210 may receive the present item listing from the client device 110, the publication system 142, or the third party servers 130. For example, the receiver module 210 may receive or otherwise access the present item listing by communicating with the client device 110 or the third party server 130 via the network 104. By way of further example, the present item listing, or a portion thereof, may be stored within the database 126 of the publication system 142 and retrieved, or otherwise accessed, by the receiver module 210.

In some instances, the receiver module 210 receives the present item listing in its entirety, as a previously generated present item listing. In some embodiments, the receiver module 210 receives data indicative of one or more portions of the present item listing. In these embodiments, a seller of the present item may compose the present item listing using the publication system 142, or any other suitable system, in communication with the price guidance system 150 in order to determine or assist in the generation of one or more aspects of the present item listing prior to completion of the present item listing.

The access module 220 accesses a set of historical item listings for use by the price guidance system 150. The access module 220 can be a hardware implemented module or a hardware-software implemented module. An example embodiment of components, the access module 220 is described below with respect to the section entitled "Modules, Components, and Logic." In general, the access module 220 includes components and instructions suitable to access the historical item listings from a predetermined storage location or source.

The access module 220 may access the set of historical item listings stored on the publication system 142 or the third party servers 130 via the network 104. In some embodiments, the set of historical item listings may be stored within the database 126 of the publication system 142. In some embodiments, as discussed in more detail below, the set of historical item listings may be selected from a larger set of historical item listings and be selected based on a determined similarity to the present item listing.

The determination module 230 can be understood as a module configured to detect commonalities, similarities, and patterns among data sets and suggested actions based on the determined commonalities, similarities, and patterns. For example, the determination module 230 determines similarities among item listings, present and historic, and bid ranges among bid velocity data, according to some embodiments. In determining similarities between data sets, the determination module 230 may determine or otherwise generate similarity scores among the data sets. In some instances, the determination module 230 determines similarity scores among sets of items, present and historic. The determination module 230 may also determine expected prices for item listings and proximities of sets of bid ranges to the expected price. In some example embodiments, the determination module 230 can determine auction types, start times, and other aspects relating to offering a present item listing for sale. The determination module 230 can be a hardware implemented module or a hardware-software implemented module. An example embodiment of components of the determination module 230 is described with respect to the module described below in the section entitled "Modules, Components, and Logic."

The generation module 240 may be understood as a module configured to generate models. In some embodiments, the generation module 240 generates the models based on data sets received by the receiver module 210, accessed by access module 220, and using patterns determined by the determination module 230. For example, in some instances, similarity between a first item and a second item is computed by the cosine of two matrices comprised of factors representing the items. Factors may include categories of items, age of items, artist names, starting bid price, place of origin, and other factors suitable to describe aspects of an item. The factors may be quantified using codes in a uniform manner to enable processing of the matrices. In some instances, similarity may be determined using clustering algorithms, where the factors for each of the first and second items are input into the clustering algorithm to output similarity scores between the items. In some example embodiments, the generation module 240 generates a price guidance model based on one or more data sets from the above-referenced modules or a dynamic bidding model based on one or more data sets from the above-referenced modules. The price guidance model may be used in generation of suggested prices for the items. The dynamic bidding model may be used in generating suggested bids as well as bidding notifications for a user 106 attempting to purchase an item. The generation module 240 can be a hardware implemented module or a hardware-software implemented module. An example embodiment of components of the generation module 240 is described with respect to the module described below in the section entitled "Modules, Components, and Logic."

The selection module 250 can be a module configured to receive, make, or otherwise effect selections from within data sets gathered or produced by the above-referenced modules, for use within models generated by the generation module 240. In some example embodiments, the selection module 250 selects bid ranges from among a set of bid ranges for use in the price guidance model. In order to select the bid ranges, the selection module 250 may perform one or more database queries on a database (e.g., database 126) on which the bid ranges are stored. The selection module 250 can be a hardware implemented module or a hardware-software implemented module. An example embodiment of components of the selection module 250 is described with respect to the module described below in the section entitled "Modules, Components, and Logic."

In some embodiments, the presentation module 260 causes presentation of a set of suggested prices, generated using the price guidance model, on a client device (e.g., the client device 110). In some instances, the presentation module 260 causes presentation of a suggested auction type on a client device (e.g., the client device 110). As explained in more detail below, in some embodiments, the presentation module 260 causes presentation of a suggested start time for an auction of the present item listing. The presentation module 260, in some instances, causes presentation of the one or more bidding notifications, generated by the dynamic bidding model, on a client device (e.g., the client device 110).

The presentation module 260 can cause presentation of the suggested prices, the suggested auction type, the suggested start time, and the one or more bidding notifications on the user interface of the client device 110. In some embodiments, the presentation module 260 causes presentation by transmitting data indicative of the suggested prices, auction type, start time, and bidding notifications to the client device 110. In some instances, the presentation module 260 is implemented within the publication system 142 in the context of a web application, a server based application, or a client-side application 114 (e.g., all or a portion of an application stored on the client device 110). The presentation module 260 can be a hardware implemented module or a hardware-software implemented module. An example embodiment of components of the presentation module 260 is described with respect to the module described below in the section entitled "Modules, Components, and Logic."

The bidding module 270 may be understood as a module configured to provide or facilitate bidding functions. In some example embodiments, the bidding module 270 enters proxy bids based on a maximum proxy bid value and data sets generated or analyzed by the bidding model, generated by the generation module 240. The bidding module 270 can be a hardware implemented module or a hardware-software implemented module. An example embodiment of components of the bidding module 270 is described with respect to the module described below in the section entitled "Modules, Components, and Logic."

The communications module 280 enables communication between the client device 110, the price guidance system 150, and one or more external systems (e.g., the third party servers 130). In some example embodiments, the communications module 280 enables communication among the receiver module 210, the access module 220, the determination module 230, the generation module 240, the selection module 250, the presentation module 260, and the bidding module 270. The communications module 280 can be a hardware implemented module or a hardware-software implemented module, as described in more detail below. For example, the communication module 280 can include communications mechanisms such as an antenna, a transmitter, one or more buses, and other suitable communication mechanisms capable of enabling communication between the modules 210-270, the client device 110, the price guidance system 150, and the publication system 142. An example embodiment of components of the communication module 280 is described with respect to the module described below in the section entitled "Modules, Components, and Logic."

Figure 3:
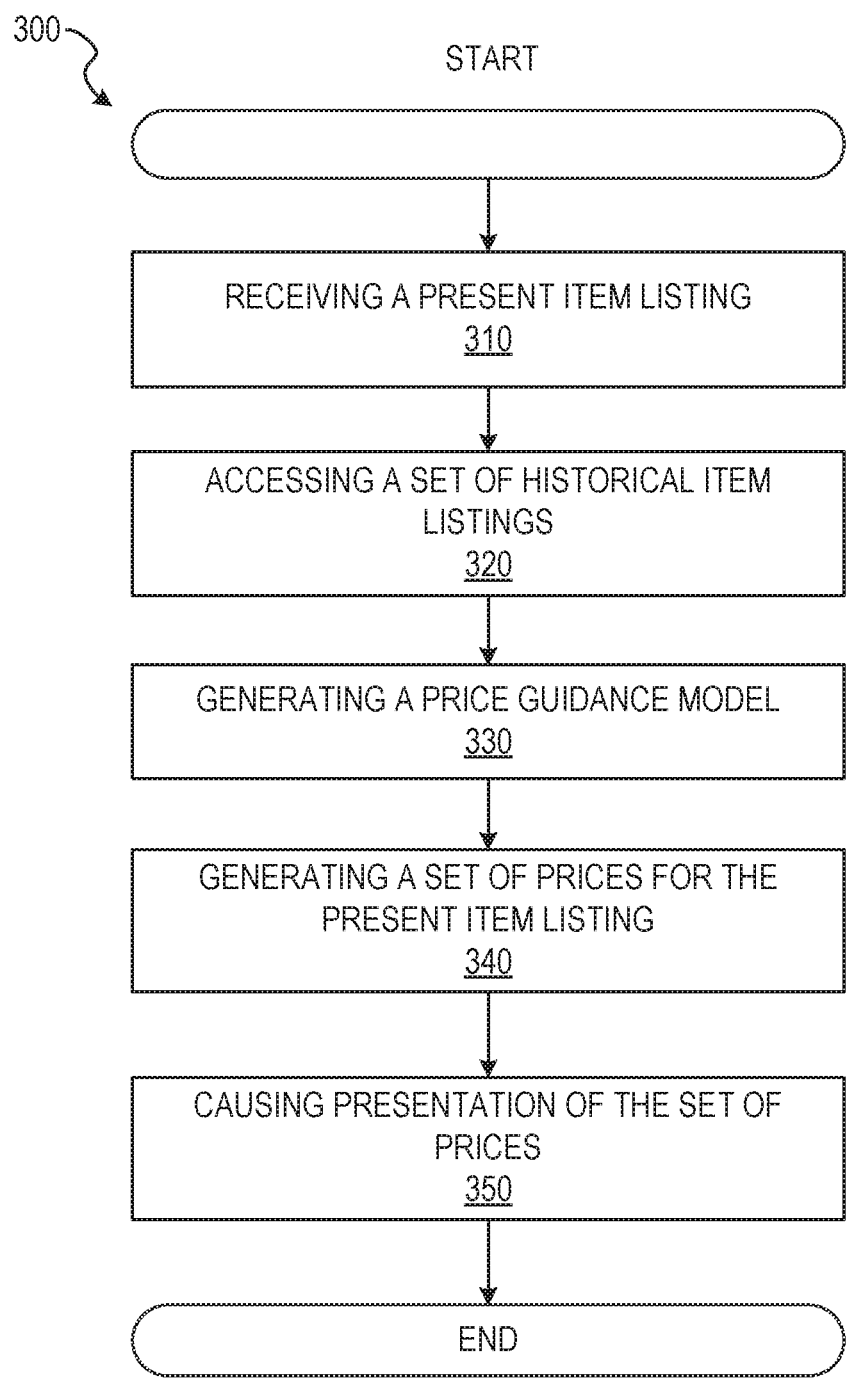
FIG. 3 is a flow chart illustrating an example method, according to various embodiments.

FIG. 3 is a flow chart of operations of the price guidance system 150 in performing a method 300 of generating a set of suggested prices for a present item listing, according to some example embodiments. Operations in the method 300 may be performed by the price guidance system 150, using modules described above with respect to FIG. 2.

Figure 4:
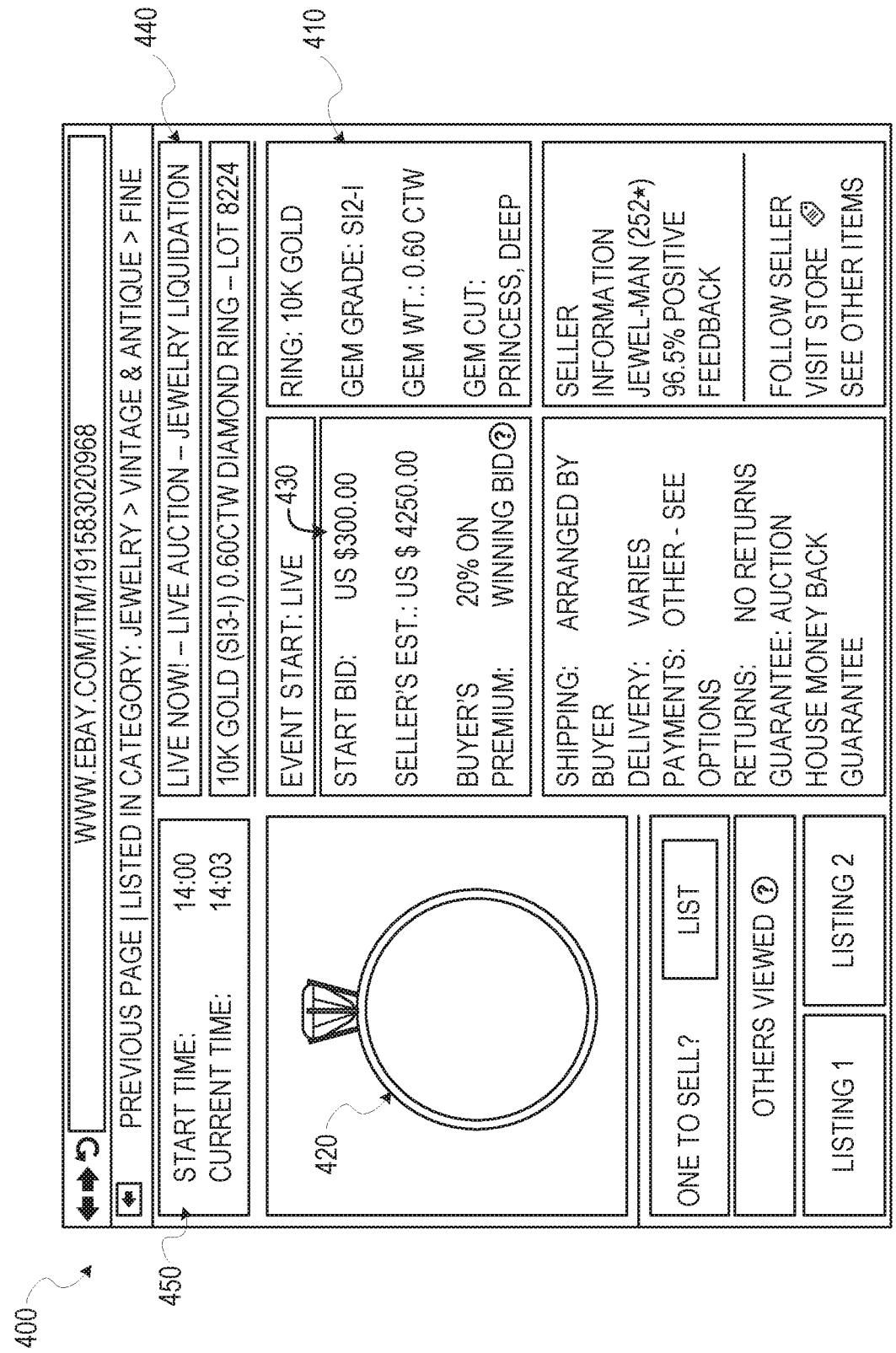
FIG. 4 is an example interface diagram illustrating a user interface screen including a present item listing, according to various embodiments.

In operation 310, the receiver module 210 receives a present item listing 400 indicative of a present item, shown in FIG. 4. The present item listing includes a set of present characteristics 410 describing the present item 420. Referring again to FIG. 3, the receiver module 210 may receive the present item listing 400 from a user 106 of the network-based publication system 142 or may be caused to access the present item listing 400. Where the receiver module 210 is caused to access the present item listing 400, the receiver module 210 may be directed to access the present item listing 400 by a user 106 associated with the present item listing 400, by the network-based publication system 142, or by another user 106 of the network-based publication system 142. In some example embodiments, the receiver module 210 receives the present item listing 400 via the network 104 from the client device 110. In some instances, the receiver module 210 receives or is caused to access the present item listing 400 stored in the network-based publication system 142 or the third party server 130.

As previously noted, in some example embodiments, the present item listing 400 comprises a set of present characteristics 410 describing the present item 420. The present characteristics 410 may be understood as one or more sets of data representative of a description of the present item 420. The present characteristics 410 comprise one or more of an identification element (e.g., an identification number, serial number, Vehicle Identification Number, etc.), a type (e.g., make, model, trim, etc.) for the present item 420, a category of the present item 420, a physical description (e.g., color, shape, condition, size, etc.) of the present item 420, an item history report, an item rating (e.g., a Professional Coin Grading Service rating, a gem grading chart, a National Auto Auction Association grade, etc.), one or more images of the present item 420 or representative of the present item 420, terms of sale or auction of the present item 420, shipping terms and information, payment terms and information, return terms and information, and other information suitable to identify the present item 420 and differentiate or indicate similarity of the present item 420 to other items.

In some instances, as shown in FIG. 4, the present item listing 400 further comprises a price 430 for the present item 420. The price 430 for the item listing 400 may be a set price (e.g., a sale price or a "Buy It Now" price), a reserve price, a starting bid, a starting offer, and other information representative of a price for the item. In some embodiments, the present item listing 400 further comprises data representative of a listing type 440. Listing types 440 include auction types (e.g., English auction, Dutch auction, timed auction, sealed first-price auction, a multiunit auction, reserve auction, etc.), fixed price sale, best offer sales, and other suitable methods to sell or otherwise transfer away an item. The present item listing 400 may also indicate a time 450. Where listed, the time 450 for the present item listing 400 includes one or more of a starting time of a sale, a starting time of an auction, an ending time of a sale, an ending time of an auction, an estimated starting time of an auction (e.g., an estimated starting time of an auction run at the partial discretion of an auctioneer), or other information relating to timing of an item listing.

In various example embodiments, the set of present characteristics 410 are included as one or more characteristic data segments (e.g., bits, bytes, processor executable code, processor readable code, HTML code segments, XML code segments, metadata, etc.) within a listing data set representative of the present item listing 400. The listing data set may be understood as a set of processor executable code or instructions configured to cause display of the present item listing 400 as a set of user interface elements in the user interface of the client device 110. The one or more characteristic data segments may be initially set by the user 106 associated with the present item listing 400, and one or more of the characteristic data segments may be modified by the price guidance system 150 representative of a change in the description of the present item listing 400. In various instances, the price 430 information for the present item listing 400 is included as one or more price data segments within the listing data set representative of the present item listing 400. The price information may be initially set by the user 106 associated with the present item listing 400. In some example embodiments, the price guidance system 150 is configured to change one or more of the price data segments to cause a modification to the present item listing 400 representative of a change in one or more aspect of the price 430 of the present item listing 400. Further, the time 450 for the present item listing 400 is included as one or more timing data segments within the listing data set representative of the a time or duration associated with the present item listing 400. The time 450 may be initially set by the user 106 associated with the present item listing 400 or the price guidance system 150, and may be modified by the price guidance system 150, according to some example embodiments.

Receiving of the present item listing 400 may be performed as part of the creation of the present item listing 400 or after creation of the present item listing 400. In some example embodiments, receiving the present item listing 400 can initiate a method for review of the present item listing 400 prior to completion and creation (e.g., storage and listing on the network-based publication system 142) of the present item listing 400 to assist a seller (e.g., the user 106 causing transmission of the present item listing 400) in determining a price 430, an expected revenue to be received, or an selling format (e.g., auction type, sale, listing in a store) for the present item listing 400. In some example embodiment, when the present item listing 400 is received after its creation, receiving the present item listing 400 may initiate a method to determine an expected revenue to be generated by the present item listing 400, as will be explained in more detail below. Similarly, in some instances, the receiver module 210 receives a set of present item listings 400 (e.g., where the seller has a plurality of present items 420 to sell). In these instances, receiving the set of present item listings 400 may indicate a method to determine an expected revenue to be generated by sale or auction of the set of present item listings 400.

Figure 5:
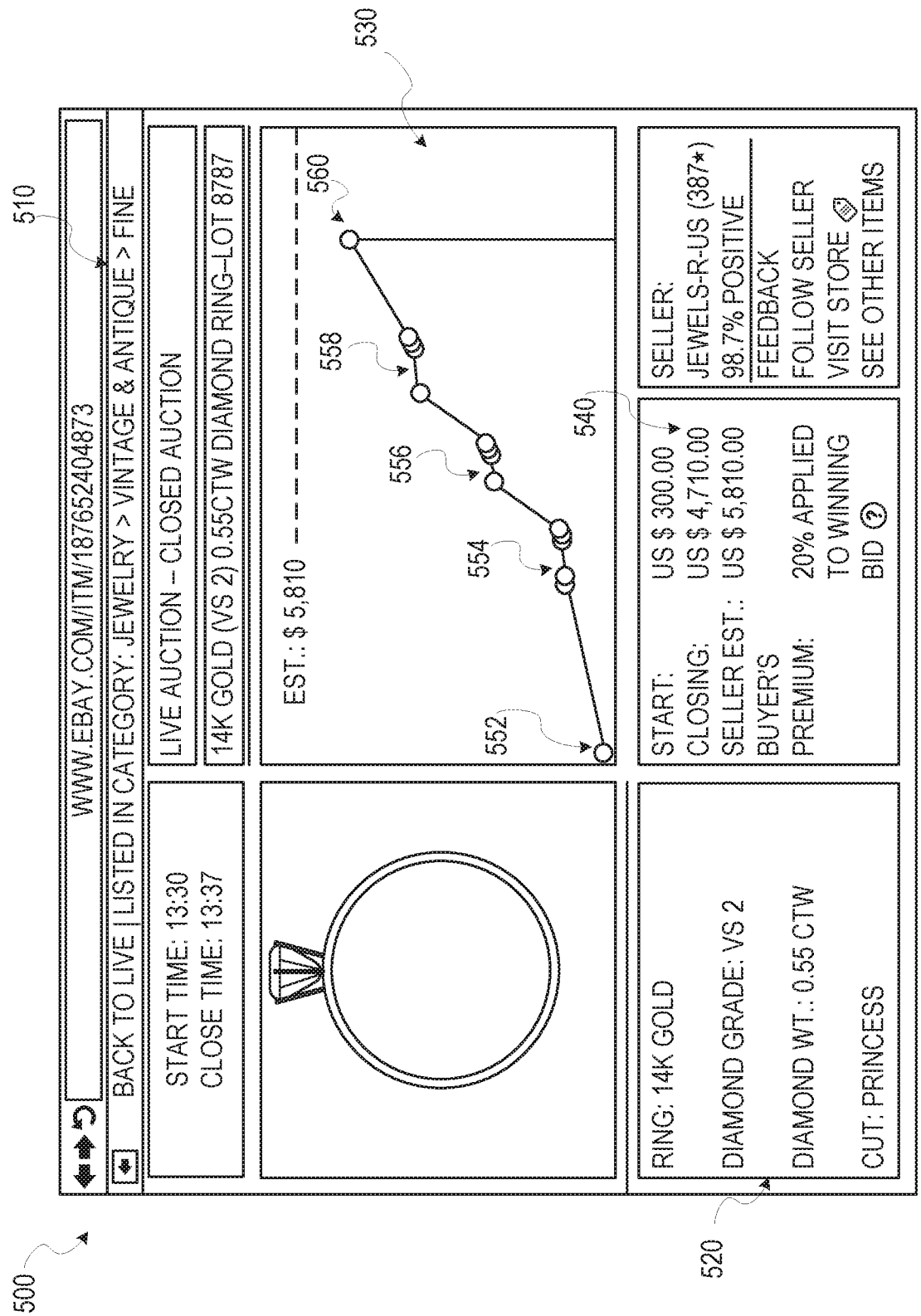
FIG. 5 is an example interface diagram illustrating a user interface screen including a historical item listing, according to various embodiments.

In operation 320, the access module 220 accesses a set of historical item listings. An example historical item listing 500 is shown in FIG. 5. In some embodiments, the historical item listings include a similarity score. The similarity score for each historical item listing may be generated by the determination module 230. For every item I that is stored in the database 126, the determination module 230 calculates a similarity score, $I_1 \ldots I_N$, as described above. In some embodiments, when selecting the historical item listings from the database to generate the price guidance model, the access module 220 selects a set of historical item listings in order of similarity score. For example, the access module may select the top 100 historical item listings in order of similarity score.

The access module 220 accesses the set of historical item listings 500 stored on one or more of the network-based publication system 142 and the third party server 130. In some embodiments, the access module 220 performs one or more functions in conjunction with the communications module 280, described above, to access the set of historical item listings 500. For example, the access module 22.0 uses the communication module 280 to communicate with one or more of the network-based publication system 142 and the third party server 130 over the network 104. When communicating with the network-based publication system 142 or the third party server 130, instructions transmitted by the access module 220 comprise instructions to the network-based publication system 142 or the third party server 130 to retrieve and transmit discrete portions of data forming the set of historical item listings 500 to the access module 220. In some example embodiments, the functions causing transmission of the set of historical item listings 500 comprise one or more API calls and/or one or more database queries.

Each historical item listing 500 of the set of historical item listings 500 comprises one or more of a category 510, a set of historical characteristics 520, and a set of bid velocity data 530. The bid velocity data 530 may be understood to be indicative of bid values and temporal relationships among the bids placed for each historical item listing 500. As shown in FIG. 5, in various example embodiments, the set of bid velocity data 530 is displayed during bidding as a graph of bid values with respect to a time duration of the auction. The visualization of the set of bid velocity data 530 may indicate a rate and frequency for bids, price ranges for which bidders show interest in the item at auction, how quickly items are selling during an auction, expected price ranges for items price ranges of interest and closing price ranges), and other information relating to the sale of an item for which bids are accepted. The set of bid velocity data 530 may be determined by a set of velocity factors. The velocity factors comprise a number of bidders bidding concurrently or in succession on the item at auction, a number of people registered to bid on an auction, a location of the auction, a number of bids, a time 450 of auction (e.g., auction start time during a day, time of year or month of the auction) and time of bidding (e.g., elapsed time between start of the auction and the bid, elapsed time between a current bid and a previous or subsequent bid, etc.), a price 430 (e.g., starting bid price and current bid price), a number of bidders bidding (e.g., actively participating in an auction) at a given price range or bid range, and a listing type 440 (e.g., live auction, timed auction, etc.) for the item up for bid. In some embodiments, aspects of the set of bid velocity data 530 may be determined by functions performed on or with respect to the velocity factors. For example, aspects of the set of bid velocity data 530, used to generate a price guidance model, may be determined by examining the time 450 of bids, price of bids, and/or number of bidders divided by the number of bids (e.g., the total number of bids, the number of bids in a given price range, etc.).

The set of historical characteristics 520 further comprises one or more of one or more characteristic data segments, similar to the characteristic data segments discussed above with respect to the present item listing 400. In some example embodiments, as shown in FIG. 5, the set of historical characteristics 520 includes a closing price 540 and the set of bid velocity data 530, represented by one or more pricing data segments, similar to the present item listing 400, described above.

The data segments comprise bits, bytes, processor executable code, processor readable code, HyperText Markup Language(HTML) code segments, Extensible Markup Language (XML) code segments, metadata, or other suitable data configured to convey information about the set of historical items represented by the historical item listings 500. The data segments may be configured to cause display of the historical item listing 500 when executed or otherwise processed by a processor of a client device 110 or other computer system. Similar to the characteristic data segments of the present item listing 400, the one or more characteristic data segments for the historical item listing 500 may be initially set by the user 106 associated with each of the historical item listing 500, and one or more of the characteristic data segments may be modified by the price guidance system 150 based on a change in the description of the historic item listing 500 or a closing of the historical item listing 500. In various instances, the price information (e.g., starting price, sale price, closing price 540, bids prior to close, bid velocity data 530, etc.) for each of the historic item listings 500 is included as one or more price data segments within the listing data set representative of each of the historic item listings 500. The price information may be initially set by the user 106 associated with the historic item listing 500 and may be modified by the price guidance system 150 based on a change in price of the historic item listing 500 or a closing of the historic item listing 500. Further, the time 450 for each of the historic item listings 500 is included as one or more timing data segments within the listing data set representative of the a closing time or an elapsed time duration of each of the historic item listings 500.

In operation 330, the generation module 240 generates a price guidance model for the present item 420 based on the set of historical item listings 500 and the set of bid velocity data 530 for the set of historical item listings 500. The generation module 240 generates the price guidance model based in part on the historical characteristics 520 of the set of historical item listings and the present characteristics of the present item listing. In some example embodiments described in more detail below, the generation module 240 detects one or more similarities among the set of historical item listings and the present item listing by determining one or more similar characteristics among the set of present characteristics 410 and the set of historical characteristics 520. For example, in live auctions, live auction item catalogues may be provided ahead of the scheduled commencement of the live auction. The generation module 240 generates a similarity table, stored in the database 126, upon receiving the live auction catalogue prior to the auction commencing. In these embodiments, the price guidance model is generated such that, during the live auction, price guidance information (e.g., suggested bids, suggested watch and bid times) are looked up at runtime for the item currently at auction. In various embodiments described herein, the generation module 240 cooperates with one or more other modules of the price guidance system 150 to detect the one or more similarities among the set of historical item listings 500 and the present item listing 400. In some embodiments, the price guidance model is generated as an executable model, receiving input in the form of historical item listings or bid velocity data representative of historical item listings, and outputting a dynamic price graph. In some instances, the price guidance model may be a set of instructions which are fitted by the generation module 240 in order to generate the price guidance model.

Where the price guidance model is generated prior to commencement of an auction, the generation module 240 scans items added to live auction catalogues. For each item, similarity scores are generated for similar items $I_1 \ldots I_N$, where there are N items in the database 126. The similarity scores are computed based on item matrices, as described above. The items $I_1 \ldots I_N$ are arranged in order of descending similarity score. The price guidance model may include a lookup function generating one or more database calls such that, during runtime, a lookup function is performed (e.g., a database call to retrieve a set of items above a similarity threshold based on the generated similarity scores). The price guidance model analyzes the bid velocities for each of the historical items retrieved in the lookup and may generate a dynamic price graph for identifying suggested bids.

In operation 340, the generation module 240 generates a set of prices for the present item 420 based on the price guidance model. In some example embodiments, generating the set of prices includes the selection module 250 selecting one or more prices from the set of bid ranges based on the similarity (e.g., the one or more similar characteristics) determined between the present item 420 and the one or more similar historical item listings 500. In some example embodiments, the set of prices is generated based on the one or more similar characteristics and the relative weights of the one or more similar characteristics (e.g., similar characteristics in the item descriptions, similar auction types, similar time of year the items were listed for sale, etc.). In some instances, the set of prices includes a price range of an expected closing price 540 for the present item listing 400. The set of prices may comprise an amalgam of the closing prices 540 and bid velocity data 530 of the one or more similar historical item listings 500. For example, the set of prices may comprise a price range including prices of three out of four of the similar historical item listings 500, where the selection module 250 determines the fourth similar historical item listing 500 to be an outlier in terms of closing price 540. By way of further example, the set of prices may comprise a price range including bid data of the bid velocity data 530 proximate to, but not including the closing price 540 of two out of three similar historical item listings 500, where the selection module 250 determines that the two similar historical item listings 500 included differentiating historical characteristics 520 (e.g., historical characteristics determined to not to be similar to the present characteristics 410) or outlier closing prices 540 based on a frequency of the bid velocity data 530 and the number of active bidders contributing to the bid velocity data 530.

In some example embodiments, differentiating historical characteristics may be understood as historical characteristics determined to not be similar to the present characteristics 410 or historical characteristics which differentiate (e.g., place the historical item in another category, sub-category, negatively affect the value of the historical item in comparison to the present item 420, or positively affect the value of the historical item in comparison to the present item 420) the historical item listing from the present item listing 400. The differentiating historical characteristics may be determined by similarity scores for historical characteristics which fall below a minimum similarity threshold or historical characteristics which cause the historical item to be categorized in a category or sub-category different from that of the present item listing 400.

In some embodiments, bid velocity data is represented in a graph where the X axis is time and the Y axis is a bid amount. Each point in the graph is weighted by a number of bidders who placed a bid for that amount or placed a bid proximate to that amount. The generation module 240 then analyzes the current bid velocity of an item at auction and determines which items within the set retrieved by the lookup function present a bid velocity graph proximate to the bid velocity graph of the current item at auction. The generation module 240 then generates the set of prices to include a price representing a mean of the final price of historical item listings having a bid velocity graph proximate to the behavior displayed in the current bid velocity of the current item at auction.

In operation 350, the presentation module 260 causes presentation of the set of prices on a client device 110. In various example embodiments, the presentation module 260 causes presentation of the set of prices by transmitting the set of prices to the client device 110. In causing presentation of the set of prices, the client device 110 or the presentation module 260 cause one or more user perceivable user interface elements to be generated and presented to the user 106. For example, the set of prices may be generated as visible user interface elements on the user interface of the client device 110, as audible user interface elements played through an audio output device of the client device 110, or through other user perceivable methods of presentation. In some example embodiments, where the present item listing 400 has not yet been completed and listed on the network-based publication system 142, the set of prices are presented as one or more selectable user interface elements within the present item listing 400. The one or more selectable user interface elements are selectable by the user 106 associated with the client device 110 to incorporate a selected price from the set of prices as the price 430 (e.g., starting price, reserve price, buy it now price, or sale price) of the present item listing 400.

Figure 6:
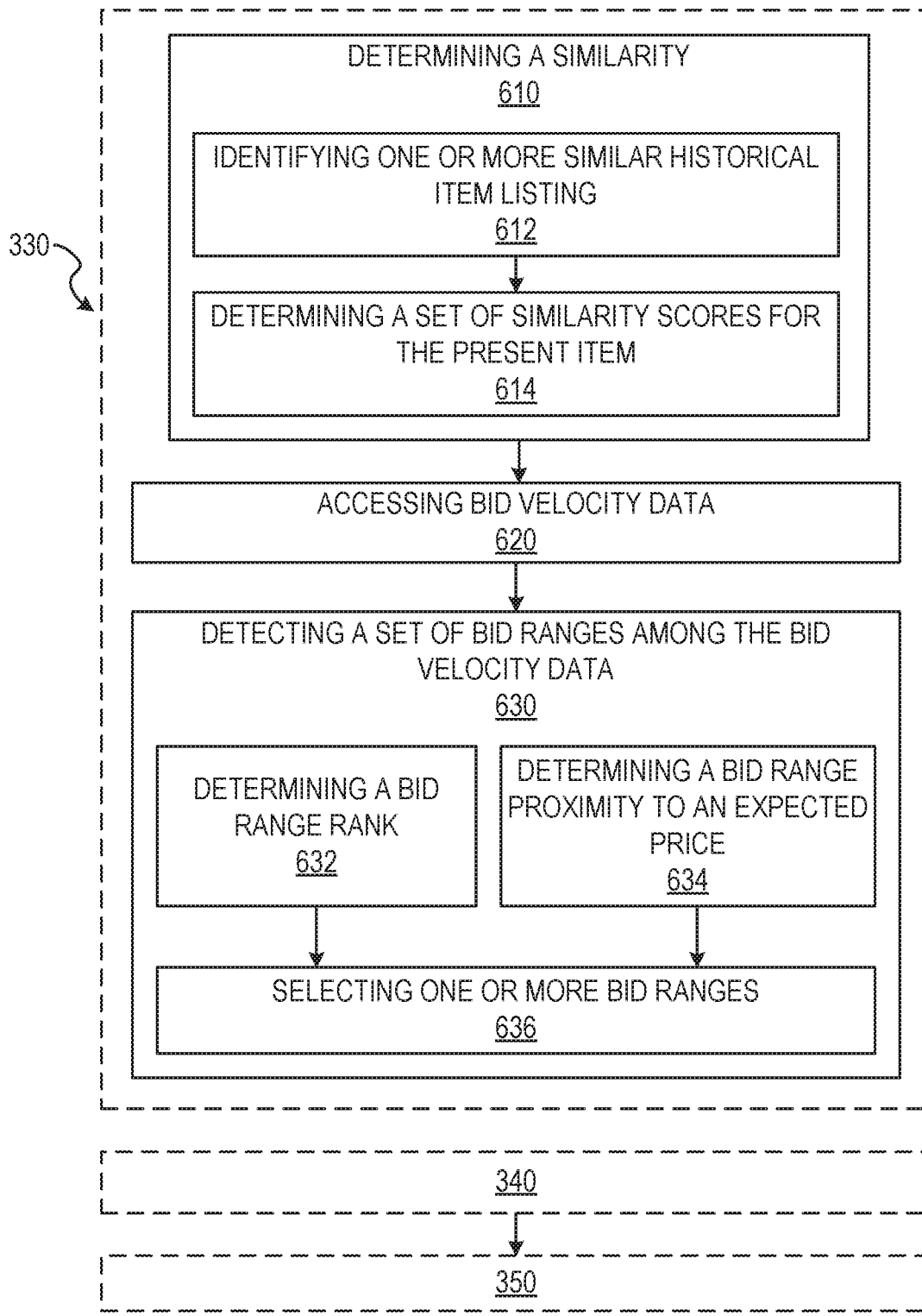
FIG. 6 is a flow chart illustrating an example method, according to various embodiments.

FIG. 6 is a flow chart of operations of the price guidance system 150 in performing the operation 330 of generating the price guidance model, according to various example embodiments. The operations depicted in FIG. 6 may be performed by the price guidance system 150, using modules described above with respect to FIG. 2.

In operation 610, the determination module 230 determines a similarity between the present item 420 and one or more historical item listings 500 of the set of historical item listings 500. In various example embodiments, the similarity among the present item listing 420 and the one or more historical item listings 500 may be determined by the determination module 230 performing analysis on the present characteristics 410 of the present item listing 400 and the historical characteristics 520 of the one or more historical item listings 500. In these embodiments, the similarity is determined by detecting one or more similar characteristics among the historical characteristics 520 and the present characteristics 410.

Where the historical characteristics 520 and the present characteristics 410 contain one or more keywords, the determination module 230 determines the one or more similar characteristics by analyzing the historical characteristics 520 and the present characteristics 410 using one or more functions detecting matches among the keywords. Keywords of the historical characteristics 520 and the present characteristics 410 may be understood as words within a text description, or data representative of a text description, which are identifiable and describe a historical item listing 500 or the present item listing 400, respectively. In some example embodiments, the determination module 230 also determines matches among defining values among the historical characteristics 520 and the present characteristics 410. Defining values of the historical characteristics 520 and the present characteristics 410 can be understood as values (e.g., numerical value, flag, code value, etc.) which define characteristics of a historical item listing 500 or the present item listing 400, respectively, and which are identifiable within the historical characteristics 520 or present characteristics 410. For example, the defining values may include a numerical value for a price 430, a numerical value for a time 450, a numerical value or a flag indicator for a location, a flag value for a type of auction, or other non-textual (e.g., non-keyword) values.

In various embodiments, the determination module 230 employs semantic analysis operations to determine the matches among the historical characteristics 520 and the present characteristics 410 to determine similarities among the keywords and/or defining values. The match or similarity among keywords need not be an exact match. In some example embodiments, the determination module 230 determines the one or more similarities using fuzzy logic functions to determine matches or similarities among the keywords.

In various embodiments, the operation 610 comprises one or more additional operations, including operation 612. In operation 612, the determination module 230 identifies one or more similar historical item listings 500 from the set of historical item listings 500. The one or more similar historical item listings 500 comprise historical characteristics 520 identified as among the one or more similar characteristics.

In operation 614, the determination module 230 determines a set of similarity scores for the present item 420. The set of similarity scores include a similarity score for each of the one or more similar historical item listings 500 determined to be similar to the present item 420. The set of similarity scores are based on a quantity and a relationship proximity of the one or more similar characteristics among the present characteristics 410 and the historical characteristics 520 of the one or more similar historical item listings 500. In some example embodiments, the similarity scores are based on a weighted combination of the relationship of a match (e.g., exact or semantically related) and the number of matches among the present characteristics 410 and the historical characteristics 520. In these embodiments, the similarity scores may be weighted to favor a closer relationship of the matches over a greater number of tenuous matches. For example, a first historical item listing 500 may receive a higher similarity score where its historical item characteristics have a closer relationship or similarity to the present item characteristics than the historical characteristics 520 of a second historical item listing 500. By way of further example, where the first historical item listing 500 has a greater number of historical item characteristics which are an exact match but a fewer number of overall matches to a portion of the present item characteristics, the first historical item listing 500 may receive a higher score than the second historical item listing 500 having a greater number of matches which are semantically related to the present characteristics 410 but not exact.

In operation 620, the access module 220 accesses the bid velocity data 530 for the one or more similar historical item listings 500 determined to be similar to the present item 420. As discussed above, the bid velocity data 530 of each of the historical item listings 500 may be a part of that historical item listing 500 or associated with the historical item listing 500 (e.g., metadata associated with the historical item listing 500). In various example embodiments, the access module 220 accesses the bid velocity data 530 stored on the network-based publication system 142 or the third party server 130 via the network 104. The access module 220 may also access the bid velocity 530 data directly by accessing the historical item listings 500 previously accessed and loaded into memory associated with the price guidance system 150 during performance of the method 300.

In various embodiments, in operation 620, in addition to accessing the bid velocity data 530, the access module 220 accesses the closing price 540 associated with the one or more similar historical item listings 500. The access module 220 may access the closing price 540 of the one or more similar historical item listings 500 similarly to accessing the bid velocity data 530, described above.

In operation 630, the determination module 230 detects a set of bid ranges among the bid velocity data 530 for use in the price guidance model. In some instances, the set of bid ranges have a bid velocity exceeding a velocity threshold. In detecting the set of bid ranges, the determination module 230 may parse the bid velocity data 530 to determine the bid ranges among the bid velocity data 530. A bid range may be understood range of bid values placed within a time period indicating bidder interest in an item up for auction at a particular price point (e.g., a first price and a second price acting as the lower and upper bounds of the bid range). The bids of the bid range may be placed within a short time period such that a frequency of bids placed within the bid range is greater than a frequency of bids placed outside of the time period. As such, a velocity threshold may be understood as a frequency of bids which is at or above a predetermined value and indicative of an increased level of bidder interest in an item in comparison to periods of lower frequency bidding.

For example, during an auction for an item, a set of five bidders may place a series of bids (e.g., two bids each) within a time period of five seconds, where the bids range from $300 to $400. At the close of the five second time period, a first bidder of the set of five bidders may bid $450 and a second bidder waits an additional five seconds before placing a bid of $475, outbidding the first bidder. A bid range may be determined between $300 and $400 based on the short time period of five seconds during which ten bids were placed (e.g., indicating a relatively high frequency of bids for the time period). The bid range may begin at $300, based on the $300 bid initiating the period of high frequency bidding, and end at $400, based on the distance between the bids for $400 and $450 and the period of inactivity between the bids for $450 and $475.

As shown in FIG. 5, when displayed in a graph of bid values over elapsed auction time, the bid velocity includes bid ranges which may be depicted as one or more relative plateaus along an overall slope of the graph. FIG. 5 includes a starting price 552, three bid ranges 554, 556, and 558, and a closing bid 560. As described above, the three bid ranges 554, 556, and 558 are marked by an increased bid frequency with respect to the bid velocity graph as a whole. The three bid ranges 554, 556, and 558 may reflect bidder interest within three distinct price ranges (e.g., $1,000 to $1,100, $2,000 to $2,100, and $3,000 to $3,150). Further, as shown in FIG. 5, the closing price 540 for the item may be beyond any of the bid ranges, and may appear to be an outlier along the bid velocity graph. As such, in some embodiments, the closing price 540 of an item may be used to assist in determining a closing price 540 of a present item 420 based on its proximity to one or more of the bid ranges. In some embodiments, the closing price 540 may not be used to determine the closing price 540 of the present item 420 based on the closing price 540 being determined as an outlier (e.g., extending beyond the bid ranges and beyond a suitable bid range threshold).

In various example embodiments, the operation contains a further operation 632 in which the determination module 230 determines a bid range rank for the set of bid ranges based on the set of similarity scores, the closing price 540 of the one or more similar historical item listings 500, and an estimated value of the present item 420. The bid range rank may be understood to be a relative likelihood that bidding on the present item 420 will close within a given bid range. In some embodiments, the bid range with the highest bid values, determined from the one or more similar historical items, may have the highest bid range rank. In some example embodiments, the bid range with the highest bid values may have a low bid range rank, based on low similarity scores among the present item listing 400 and the historical item listing 500 from which the bid range was detected. For example, where the present item listing 400 is a ring having a lower quality gem stone and metal quality, the present item listing 400 may be unlikely to sell for the higher bid range of a historical item listing 500 having a higher quality gem stone and a higher quality metal.

In some example embodiments, the determination module 230 may determine the bid range rank by determining a relation between the one or more similar characteristics and the closing price 540 or the set of bid velocity data 530 for the one or more similar historical item listings 500. For example, the determination module 230 may determine, for each similar historical item listing 500, which of the one or more similar characteristics or historical characteristics 520 (e.g., the historical characteristics 520 which were not determined to be similar characteristics) caused variations in closing price 540 and bid velocity data 530 among the one or more similar historical item listings 500. By way of further example, the determination module 230 may isolate a historical characteristic not shared between two of the similar historical item listings 500 which had differing closing prices 540. The determination module 230 may determine that the unshaved historical characteristic 520 is related to the difference in closing prices 540 among the two similar historical item listings 500. After detecting which of the historical characteristics 520 (e.g., similar characteristics and characteristics not identified as similar) affected the closing price 540 and the bid velocity data 530 of the one or more similar historical item listings 500, the determination module 230 may determine a relative weight among the historical characteristics 520 based on a relative magnitude of the effect the historical characteristic 520 had on the closing price 540 and the bid velocity data 530. The determination module 230 may then determine and apply the bid range rank of each bid range for each of the one or more similar historical listings 500 based on the relation of the one or more similar characteristics and the closing price 540 or bid ranges.

In some embodiments, the operation 630 of detecting a set of bid ranges among the bid velocity data 530 includes one or more further operations. As shown in FIG. 6, the operation 630 includes operation 632, in which the determination module 230 determines an expected price for the present item 420 (e.g., a bid range rank) based on the one or more historical item listings 500. The expected price may be understood to be an expected closing price 540 for the present item based on the one or more historical item listings 500 with respect to the present characteristics 410 of the present item listing 400. In determining the expected price for the present item 420, the determination module 230 uses one or more of the one or more similar characteristics, the similarity scores of the one or more similar historical item listings 500, the closing price 540 of the one or more historical item listings 500, the bid velocity data 530 of the one or more historical item listings 500, the set of bid ranges, and the bid range ranks to the price guidance model as input for determining the expected price for the present item 420 according to the price guidance model. In various example embodiments, the price guidance model generates one or more of a single expected closing price 540 for the present item 420, an expected closing price range for the present item 402, and an estimated closing threshold for the expected closing price (e.g., the present item 420 is estimated to have a closing price 540 above a determined value).

In some example embodiments, the operation 630 includes operation 634. In operation 634, the determination module 230 determines a proximity of the set of bid ranges to the expected price. In various example embodiments, the determination module 230 may verify the expected price for the present item 420 by determining the proximity of one or more of the set of bid ranges to the expected price of the present item 420. Where the expected price, based on the price guidance model, is beyond a predetermined value threshold, the determination module 230 or the price guidance model revises the expected price. The predetermined value threshold may be a maximum value between a closing price 540 and the maximum value of the highest bid range for the one or more similar historical item listings 500.

In operation 636, the selection module 250 selects one or more bid ranges from the set of bid ranges for use in the price guidance model. In various embodiments, the selection module 250 selects one or more of the bid ranges having a proximity nearest the expected price. In some instances, the selection module 250 may truncate the one or more bid ranges where the plurality of the bid ranges overlap. The truncated bid range may include the lowest and the highest bids of the overlapping bid ranges, or may include only values for the bid ranges where the plurality of bid ranges overlap. In various instances, the selection module 250 selects one or more prices from the set of bid ranges or the one or more selected bid ranges.

Figure 7:
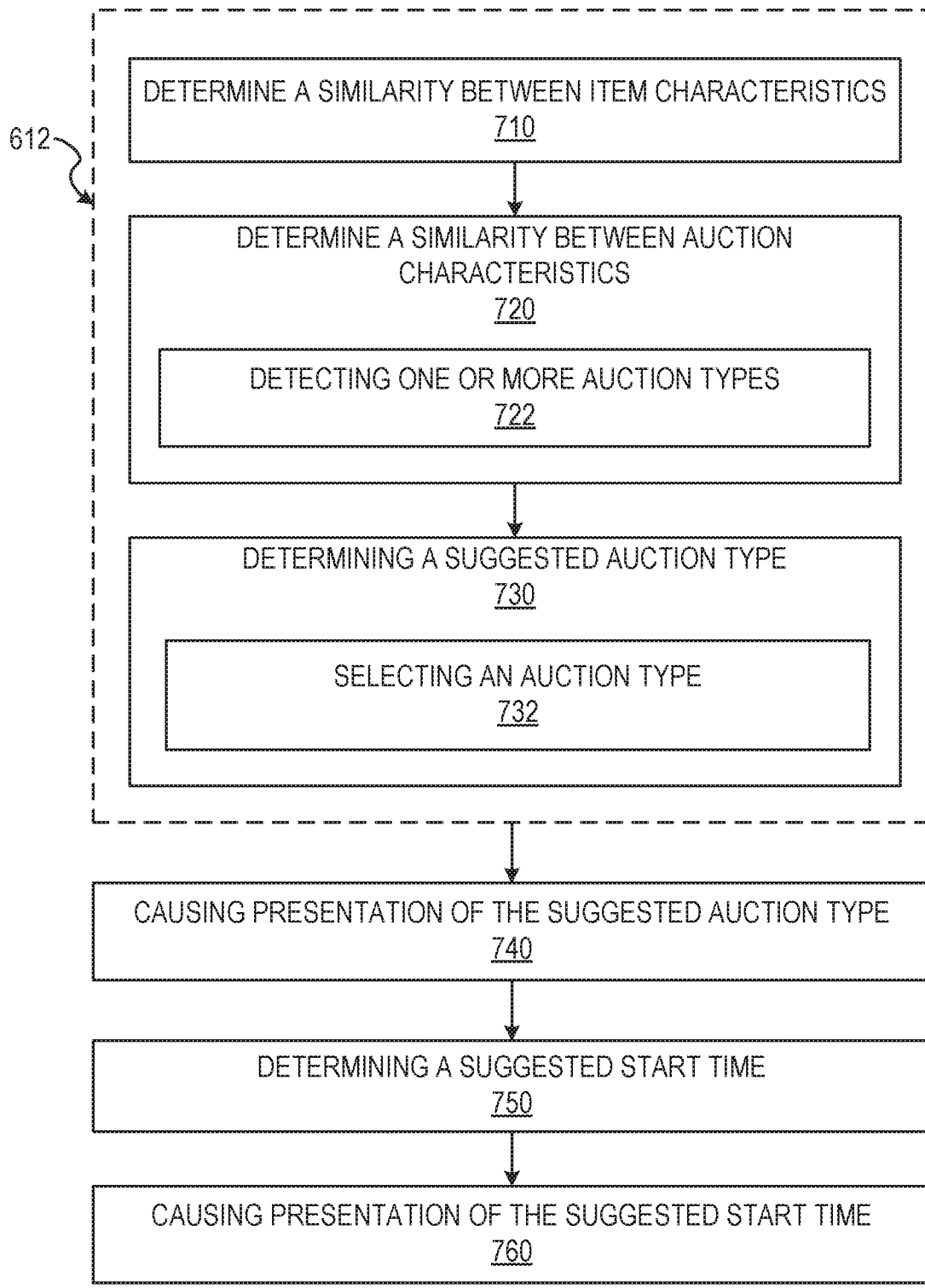
FIG. 7 is a flow chart illustrating an example method, according to various embodiments.

FIG. 7 is a flow chart of operations of the price guidance system 150 in performing the method 300 of generating a set of suggested prices for a present item listing 400, according to some example embodiments.

As shown in FIG. 7, the operation 612, in various instances, comprises a plurality of operations. The operation 612 may be performed in part through operation 710, in which the determination module 230 determines a similarity between sets of item characteristics of the one or more historical item listings 500 and the present item listing 400, similar to the operations 340 and 612 discussed above. The similarity between the sets of item characteristics is determined among sets of historical characteristics 520 of the one or more historical item listings 500 and a set of present characteristics 410 of the present item listing 400. The one or more similar historical item listings 400 are initially determined based on a comparison among item characteristics of the historical characteristics 520 and item characteristics of the present characteristics 410.

In operation 720, the determination module 230 determines a similarity between sets of historical auction characteristics of the one or more historical item listings 500 and the present item listing 400. Where the one or more historical item listings 500 contain sets of historical auction characteristics, the set of historical characteristics 520 comprises a set of item characteristics and a set of historical auction characteristics. In various example embodiments, the present item listing 400 400 is a completed item listing and includes a set of present auction characteristics. In these instances, the determination module 230 determines the similarity between the sets of historical auction characteristics of the one or more historical item listings 500 and the set of present auction characteristics of the present item listing 400.

Auction characteristics may generally be understood as a set of data describing aspects of an auction. In the case of the historical auction characteristics, the auction characteristics describe aspects of an auction at which the historical item, represented by the historical item listing 500, was sold. In the case of the present auction characteristics, the auction characteristics describe aspects of an auction at which the present item 420 is currently being sold or at which the present item 420 is to be sold at a date and time in the future. The historical auction characteristics and the present auction characteristics comprise an auction type and a starting price 552 of the auction. The historical auction characteristics may further comprise a duration of the auction, a time 450 and date at which the auction was held, a number of bidders registered as watching the auction (e.g., watching the auction in action or watching the auction prior to commencement of the auction), a number of bidders engaged (e.g., bidding) in the auction, a number of bids placed at the auction, a value of bids placed at the auction, and other information representative of an auction which has taken place. The present auction characteristics may further comprise a start time and date for the auction, a starting price 552 for the auction, a number of bidders watching the auction (e.g., watching the auction in progress or watching the auction prior to commencement of the auction), and other information relating to the auction for the present item 420 which has been scheduled to take place or which is active (e.g., an auction currently taking place).

In various example embodiments, the present item listing 400 is an incomplete item listing. In these instances, the determination module 230 determines the similarity between the sets of historical auction characteristics of the one or more historical item listings 500 and the set of present item listing 400 by comparing the sets of historical auction characteristics to the present characteristics 410 of the present item listing 400. Prior to comparing the historical auction characteristics and the present characteristics 410, the determination module 230 may determine one or more auction characteristics influenced by the historical characteristics 520. The determination module 230 may then detect a presence of present characteristics 410 similar to the historical characteristic 520 influencing the one or more auction characteristics. For example, the determination module 230 may determine that a quantity of the historical item (e.g., a plurality of historical items being offered in the same or similar historical item listings 500) influences a selection of a Dutch auction type within the auction characteristics of a historical item listing 500. The determination module 230 may then detect whether the present item listing 400 includes a quantity suitable for a Dutch auction type. By way of further example, the determination module 230 may detect that one or more of the historical items have a reserve price value within the historical auction characteristics and that an age and a condition of the historical characteristics 520 influences an existence and a value of the reserve price value. The determination module 230 may then detect whether the present item listing 400 contains similar age and condition values within the present characteristics 410 suitable for a reserve price and a value of the reserve price relative to the historical item listings 500.

In some example embodiments, where the present item listing 400 is incomplete (e.g., including no present auction characteristics), the operation 720 comprises a set of operations. In these embodiments, in operation 722, the determination module 230 detects one or more auction types for the one or more historical item listings 500, from the set of historical auction characteristics. The determination module 230 then determines whether the detected one or more auction types are suitable for the present item listing 400. In determining the suitability of the one or more auction types, the determination module 230 may determine the one or more historical characteristics 520 influencing the use of the one or more auction types and detect an existence of the same or similar characteristics, keywords, or values within the present item characteristics.

In operation 730, the determination module 230 determines a suggested auction type for the present item listing 400. The suggested auction type is determined based on the category 510, the set of historical characteristics 520, and the set of bid velocity data 530 of the set of historical item listings 500. In some example embodiments, the suggested auction type is further based on the similarity scores generated among the one or more similar historical item listings 500 and the present item listing 400. In various instances, the suggested auction type is determined based on a similarity of the historical characteristics 520, which influence the auction type, and the present characteristics 410.

In operation 732, in determining the suggested auction type, the selection module 250 selects an auction type from the one or more auction types detected in operation 722. The selection of the auction type is based on the similarity between the sets of item characteristics of the one or more similar historical item listings 500 and the present item listing 400. In some example embodiments, the similarity is determined between the sets of item characteristics and the sets of auction characteristics of the one or more historical item listings 500 and the present item listings 400, and the set of bid ranges. The selection module 250 selects the one or more auction types from the one or more auction types detected by the determination module 230 in operation 722. In some embodiments, the selection module 250 selects the one or more auction types based on the similarity scores, described above, or similarity scores generated for the item characteristics and the auction characteristics of the set of historical item listings 500 and the present item listing 400.

In operation 740, the presentation module 260 causes presentation of the suggested auction type on the client device 110. The presentation module 260 may cause presentation of the suggested auction type by transmitting data indicative of the suggested auction type to the client device 110 via the network 104. In some example embodiments, the data transmitted to the client device 110 may include user interface elements perceivable by the user 106 associated with the client device 110 when presented within the user interface of the client device 110. The data may be transmitted as encoded data (e.g., HTML encoding, XML encoding, binary, etc.) to be interpreted by the client device 110. In some instances, where the client device 110 is directly connected to or implements a portion of the price guidance system 150, the presentation module 260 may cause presentation of the suggested auction type by activating an output device (e.g., screen, touch screen, speaker, etc.) of the client device 110 and presenting the suggested auction type in a user perceivable format (e.g., user interface display on the screen, text-to-voice presentation through the speaker) to the user 106. In various example embodiments, the presentation module 260, receiving the suggested auction type from the determination module 230, may generate a system interrupt configured to cause the presentation of the suggested auction type. In some instances, the system interrupt may interrupt one or more processes being executed by the client device 110 to present the suggested auction type to the user 106.

In operation 750, the determination module 230 determines a suggested start time for the suggested auction type for the present item listing 400. The suggested start time is based on the category 510, the set of historical characteristics 520, and the set of bid velocity data 530 of the set of historical item listings 500. The determination module 230 may determine the suggested start time by comparing the start times of the one or more similar historical item listings 500. The determination module 230 may detect an effect of the start times on the closing prices 540 of the one or more similar historical item listings 500 to determine a time period estimated to positively affect the expected closing price 540 of the present item listing 400. For example, the determination module 230 may detect that auctions for a given category 510 (e.g., children's clothing) of the one or more similar historical item listings 500 close at a higher price when started prior to 5:00 p.m. on a Friday. In the above-referenced example, the determination module 230 may determine and select a start time which commences an auction for the present item listing 400 prior to 5:00 p.m. on a Friday closest to the time of the determination of the suggested start time.

In operation 760, the presentation module 260 causes presentation of the suggested start time for the present item listing 400. As discussed above, with respect to operation 740, the presentation module 260 may cause presentation of the suggested start time by transmitting data (e.g., representative of a user interface element) to the client device 110 or directly causing the client device 110 to generate one or more screens, user interface elements, or other user perceivable output.

Figure 8:
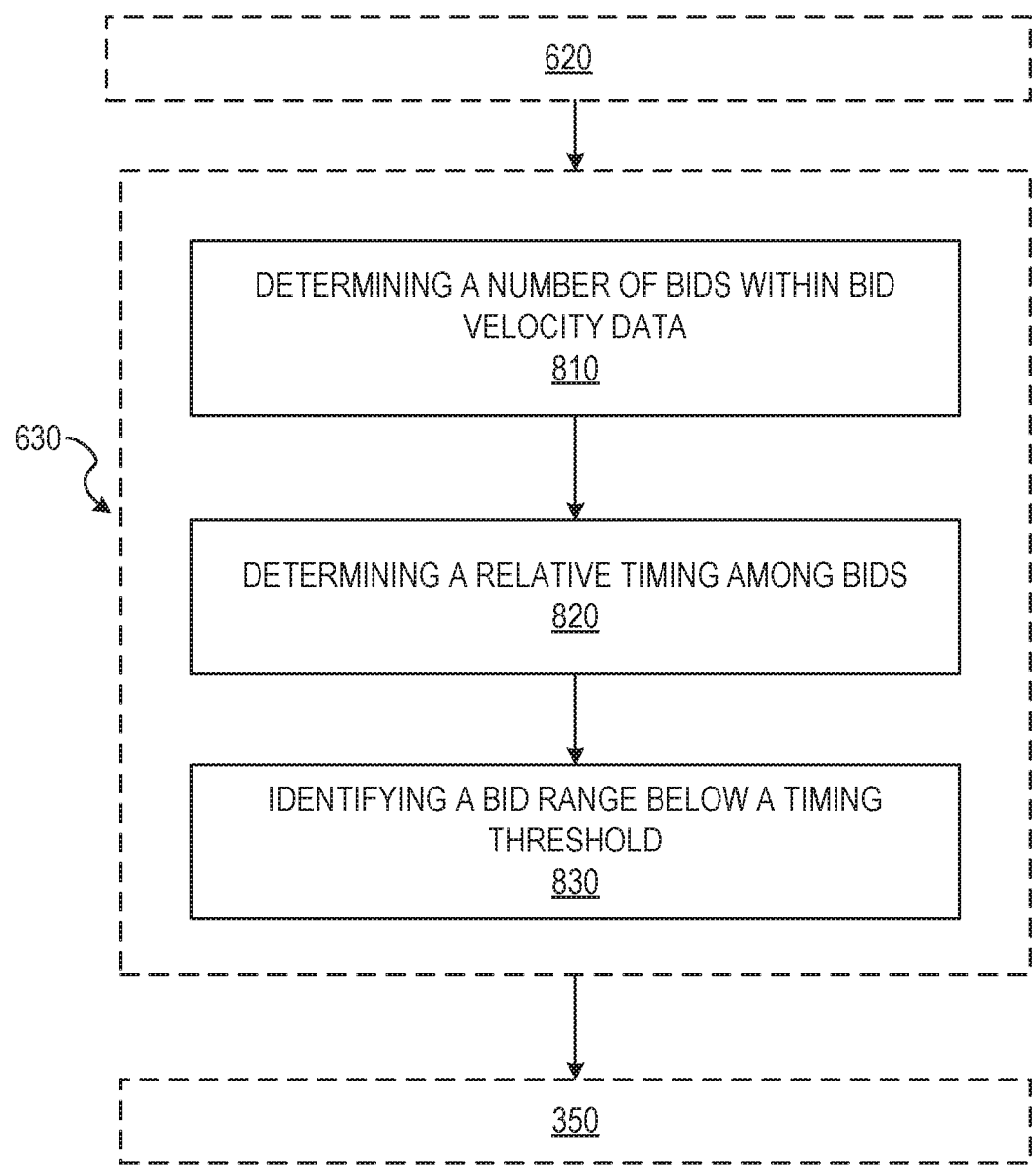
FIG. 8 is a flow chart illustrating an example method according to various embodiments.

FIG. 8 is a flow chart of operations of the price guidance system 150 in performing operations of the method 300, according to various example embodiments. Shown in FIG. 8 is a set of methods for performing the operation 630 of detecting a set of bid ranges, according to one or more of these various example embodiments.

In operation 810, the determination module 230 determines a number of bids within the set of bid velocity data 530. In some example embodiments, the determination module 230 detects the number of bids within the set of bid velocity data 530 by detecting one or more discrete data objects within the set of bid velocity data 530. The discrete data objects can be data points within a table of bids and time values for the bids. In some embodiments, the determination module 230 detects the number of bids by accessing the bid velocity data 530 on the database 126 of the network-based publication system 142 or a database element of the third party server 130.

In operation 820, the determination module 230 determines a relative timing among the bids within the set of bid velocity data 530. In various example embodiments, where the bid velocity data 530 is stored in a data table of bid values and time values, the determination module 230 detects the relative timing among the bids by detecting the timing values among the one or more discrete data objects.

In some instances, the relative timing of the bids may be determined indirectly without detecting time values within the bid velocity data 530.

In operation 830, the determination module 230 identities a bid range between a first bid and a second bid where a set of bids interspersed between the first bid and the second bid occur at a relative timing below a timing threshold. In various example embodiments, using the number of bids and the relative timing among the bids, the determination module 230 identifies periods of activity among the set of bid velocity data 530. The determination module 230 may identify the bid ranges by grouping the number of bids by frequency as determined by the number of bids within a period of time. After identifying a set of groups, the determination module 230 establishes a lower bound and an upper bound for each group by identifying within the set of groups the first bid and the second bid, between which, the frequency of bids is above a timing threshold. The timing threshold may be understood as a relative timing between bids at a frequency suitable to indicate interest in an item listing at a particular price range. In some embodiments, the timing threshold is a frequency threshold at which the frequency of bids is considered constant within a predetermined or dynamically determined error range. For example, the bid range may be determined between the first bid and the second bid, where bids between the first bid and the second bid occur at or below one second intervals as determined using the number of bids and the relative timing of the bids.

Figure 9:
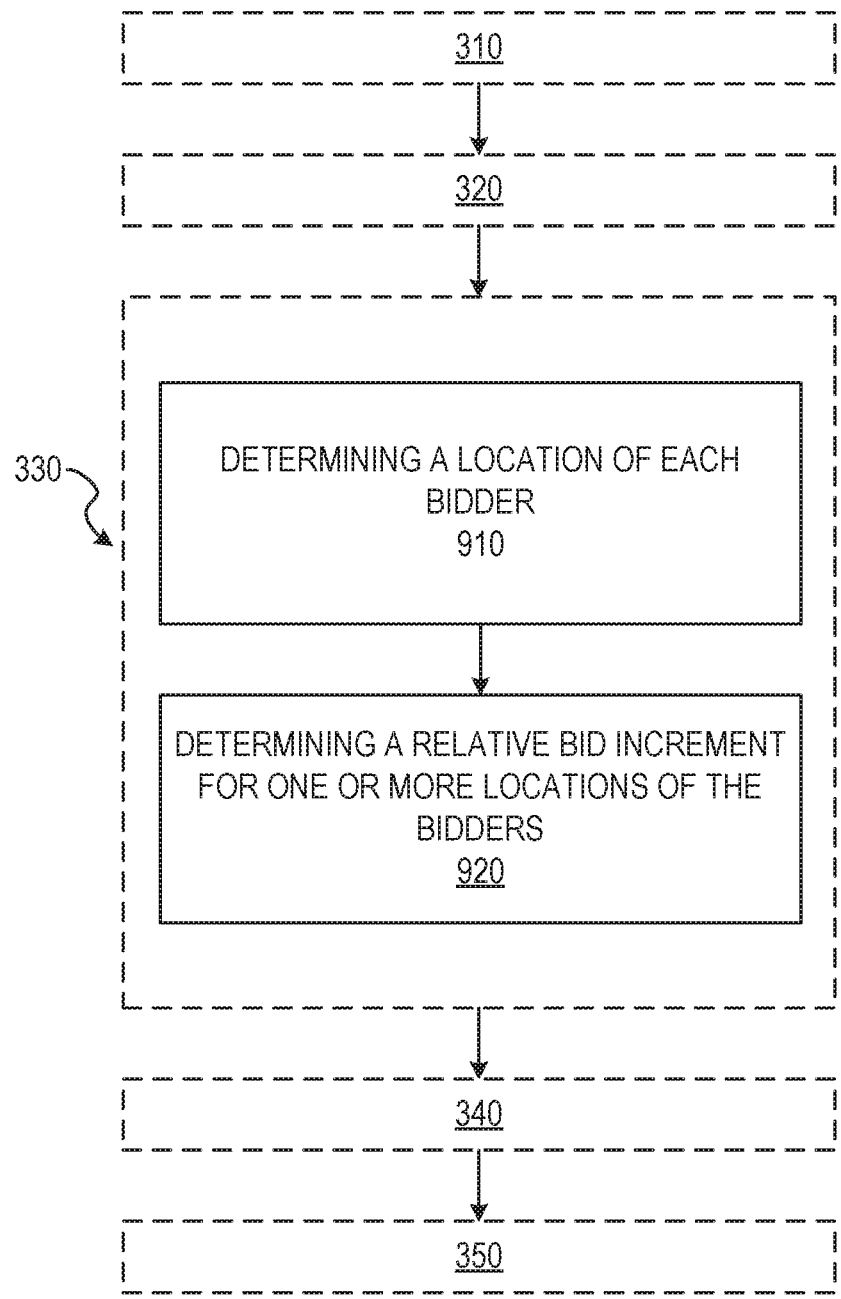
FIG. 9 is a flow chart illustrating an example method, according to various embodiments.

FIG. 9 is a flow chart of operations of the price guidance system 150 in performing the operation 330 of generating the price guidance model, according to various example embodiments. The operations depicted in FIG. 9 may be performed by the price guidance system 150, using modules described above with respect to FIG. 2, and may enable the price guidance system 150 to generate the price guidance model and a set of prices for the present item listing 400 by incorporating location considerations such as regional differences in bidding and prices.

In operation 910, the determination module 230 determines a location of each bidder associated with bids included in the set of bid velocity data 530 for each of the historical item listings 500. In various example embodiments, the determination module 230 performs operation 910 in conjunction with the access module 220. The determination module 230 causes the access module 220 to access user profile data of the bidders for each of the one or more historical item listings 500. The access module 220 may access user profiles stored on the network-based publication system 142 or the third party server 130. In some embodiments, the access module 220 may access the location of each bidder by accessing a shipping address associated with the each bidder. In some instances, the access module 220 may access location data based on an internet protocol (IP) address or other identifying data, and accessing location information associated with the IP address or other identifying data.

In operation 920, the determination module 230 determines a relative bid increment for one or more locations of the bidders associated with the bids included in the set of bid velocity data 530. The relative bid increment indicates a bid difference range representative of a first location of a first portion of the bidders relative to a second location of a second portion of the bidders. For example, the determination module 230 may determine that bidders associated with a single location or geographic area bid lower than bidders associated with another location or geographic region. In these instances, the determination module 230 may adjust expected prices or bid ranges of the present item listing 400 based on the relative bid increment for a region where the auction is to be held, a region of one or more bidder watching an auction for the present item 420, or a region of one or more bidder who has placed a bid on the present item 420.

Figure 10:
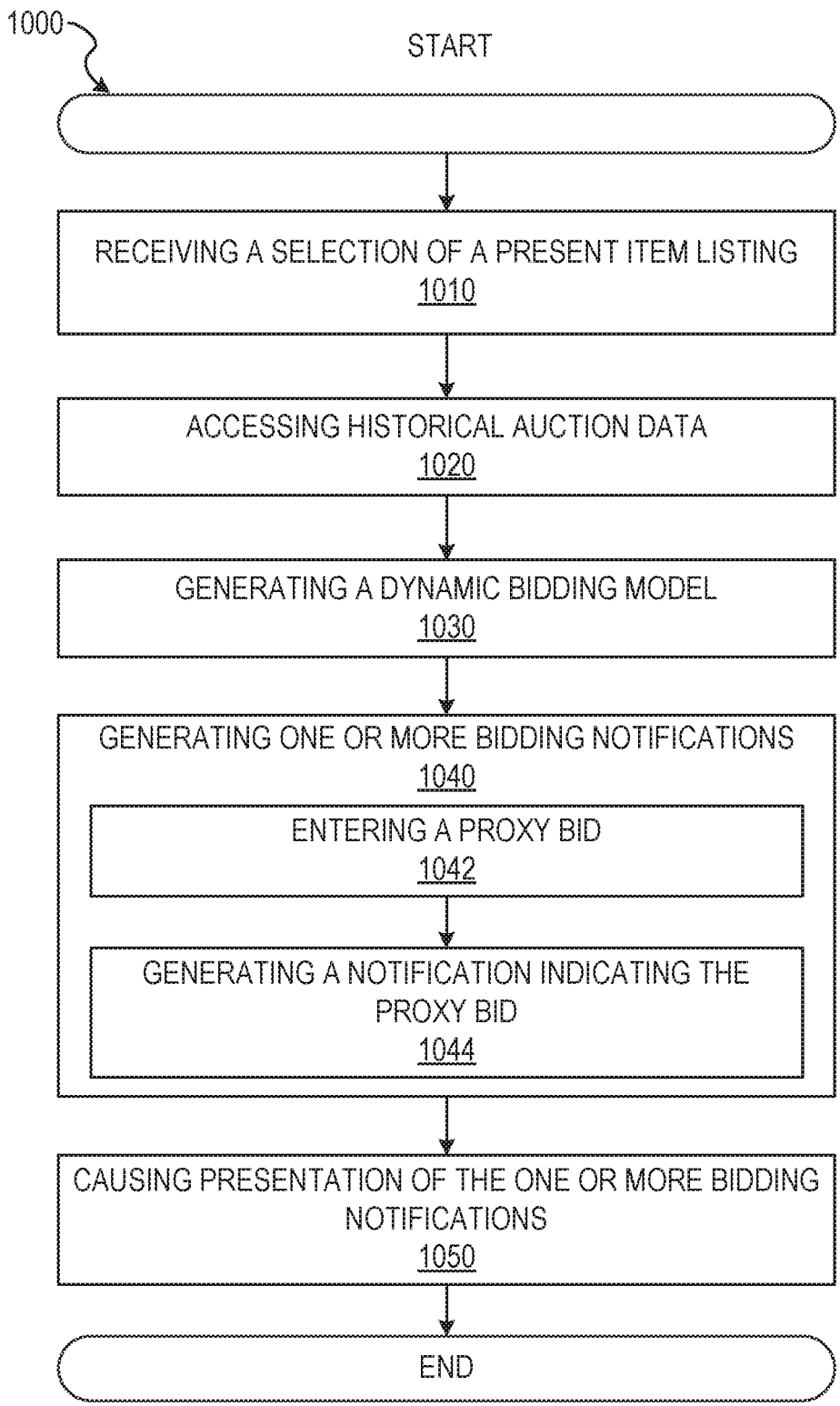
FIG. 10 is a flow chart illustrating an example method, according to various embodiments.

FIG. 10 is a flow chart of operations of the price guidance system 150 in performing a method 1000 of generating one or more bidding notifications in relation to a present item listing 400, according to some example embodiments. Operations in the method 1000 may be performed by the price guidance system 150 using modules described with respect to FIG.

In operation 1010, the receiver module 210 receives a selection of a present item listing 400. As discussed above, with respect to FIG. 4, the present item listing 400 includes a set of present characteristics 410 describing the present item 420. The receiver module 210 may receive the selection from a client device (e.g., the client device 110) associated a user 106 of the network-based publication system 142 via the network 104. The selection of the present item listing 400 may include data objects indicative of the selection and an identifier of the present item listing 400. In some example embodiments, the selection includes processor executable instructions for a user generated interrupt. The user generated interrupt, within the selection of the present item listing 400, causes the network-based publication system 142 to temporarily cease one or more processes in order to process the selection of the present item listing 400.

In operation 1020, the access module 220 accesses historical auction data for a set of historical item listings 500. As discussed above with respect to FIG. 5, each historical item listing 500 of the set of historical item listings 500 includes a category 510, a set of historical characteristics 520, and a set of bid velocity data 530. The bid velocity data 530 is indicative of bid values and temporal relationships among the bids placed for each historical item listing 500. In some example embodiments, the historical auction data includes a set of auction characteristics for each historical item listing 500 of the set of historical item listings 500. In various example embodiments, the access module 220 accesses one or more of the network-based publication system 142 and the third party server 130 over the network 104 to access the set of historical item listings 500. In some example embodiments, the access module 220 may perform one or more access operations in cooperation with the communication module 280.

In operation 1030, the generation module 240 generates a dynamic bidding model for bidding on the present item 420 based on the set of historical item listings 500 and the set of bid velocity data 530 for the set of historical item listings 500. In various example embodiments, the dynamic bidding model is generated using similarities determined between the present item 420 and one or more of the set of historical item listings 500, bid velocity data 530 for the one or more historical item listings 500, bid ranges among the bid velocity data 530, closing prices 540 of the one or more historical item listings 500, duration of bidding for the one or more historical item listings 500, a number of bidders in an auction, a number of bidders bidding on the one or more historical item listings 500, and other suitable factors or aspects of the present item listing 400, the set of historical item listings 500, and a process of selling the set of historical item listings 500.

In operation 1040, the generation module 240 generates one or more bidding notifications based on the dynamic bidding model. In various instances, the bidding notifications can be understood as one or more of a notification prompting a bid on the part of a user 106 interacting with an auction or sale including the present item listing 400, prompting a change in a maximum proxy bid, prompt viewing of the present item listing 400 or an auction including the present item listing 400, informing the user 106 that a proxy bid is being entered for the present item listing 400, indicating the user 106 may soon be outbid, indicating an estimated time at which the user 106's current bid will be exceeded or the user 106's maximum proxy bid will be exceeded, and other notifications relating to viewing, interacting with, or purchasing the present item 420 or present item listing 400. In various example embodiments, notification includes data or processor executable instructions representative of one or more user interface elements. In various instances, the notification includes processor executable instructions causing a system interrupt configured to cause interruption of one or more processes of a computing device during processing and display of the contents of the notification.

In some embodiments, in generating the one or more bidding notifications include operations 1042 and 1044. In operation 1042, the bidding module 270 enters a proxy bid below a current maximum proxy bid value for the present item listing 400. The proxy bid, entered by the bidding module 270, exceeds the current bid on the present item listing 400. The current maximum proxy bid value may be understood as a maximum value a bidder authorizes the price guidance system 150 or an automated bidding program to execute into the network-based publication system 142 for the present item listing 400 on behalf of the bidder. In various example embodiments, the bidding module 270 determines a value of the proxy bid based on a combination of the current maximum proxy bid value and a current bid for the present item listing 400. In this example, the price guidance system 150 may detect the current maximum proxy bid and the current bid for the present item listing 400, generate a bid above the current bid but below the current maximum proxy bid, and enter the generated bid into the network-based publication system 142 for the present item listing 400.

In some instances, in entering the proxy bid for the present item listing 400, the price guidance system 150 determines an optimal bid for the present item listing 400. The optimal bid may be understood as a bid having a high likelihood of winning the present item listing 400 (e.g., being the closing bid 560 or closing price 540 of the present item listing 400). The price guidance system 150 determines the optimal bid for the present item listing 400 based on the bid velocity data 530 for the set of historical item listings 500, the closing prices 540 of the set of historical item listings 500, the present item listing 400, and a determination of bid velocity data 530 for the present item listing 400. From the bid velocity of the set of historical item listings 500, the determination module 230 determines a set of bid ranges indicative of groupings of bids within the bid velocity of the set of historical data. The determination module 230 estimates an estimated closing bid range from the set of bid ranges, the closing data, and the bid velocity of the present item listing 400. The bidding module 270 then enters a bid below the current maximum proxy bid value and above an upper bid of the estimated closing bid range.

In operation 1044, the generation module 240 generates a notification indicating the proxy bid is being entered for the present item listing 400. In various example embodiments, the notification is generated as a collection of user interface elements (e.g., in the form of data objects and processor executable instructions) that indicate the proxy bid value, the proxy bid being entered, whether the proxy bid was successful (e.g., by replacing the maximum bid for the present item listing 400), a representation of the present item listing 400, and a time the bid was placed.

In operation 1050, the presentation module 260 causes presentation of the one or more bidding notifications on a client device 110. In various example instances, the presentation of the one or more bidding notification is performed by transmitting the one or more bidding notification to a client device 110 associated with the bidder. In some embodiments, the one or more bidding notifications are transmitted by the presentation module 260 in cooperation with the communication module 280 via the network 104. In some instances, a portion of the presentation module 260 may be implemented on the client device 110 of the bidder. In these instances, the presentation module 260 receives the one or more bidding notification, executes any processor executable instructions and interprets any user interface elements to cause display of the one or more bidding notifications using one or more output device of the client device 110. Here, the presentation module 260 may cause display of the one or more bidding notifications using a display device (e.g., a screen), an audio output device (e.g., a speaker), or any other suitable output device included in or associated with the client device 110.

Figure 11:
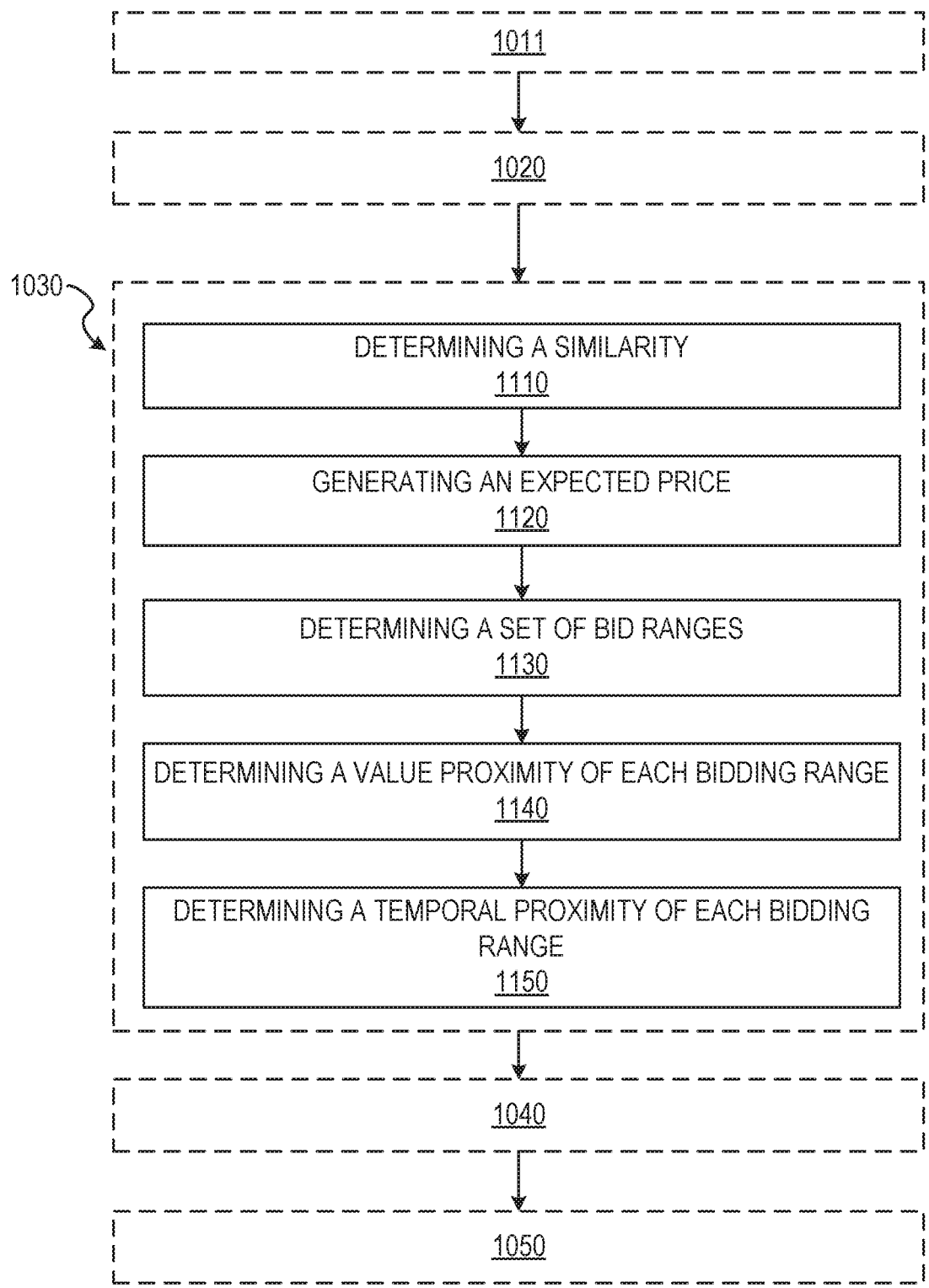
FIG. 11 is a flow chart illustrating an example method, according to various embodiments.

FIG. 11 is a flow chart of operations of the price guidance system 150 in performing the operation 1030 of generating the dynamic bidding model. The operations depicted in FIG. 11 may be performed by the price guidance system 150 using modules described with respect to FIG. 2.

In operation 1110, the determination module 230 determines a similarity between the present item 420 and one or more similar historical item listings 500 of the set of historical item listings 500. In some example embodiments, the determination module 230 may implement the operation 1110 similarly to or the same as operation 610. The determination module 230 may determine the similarity between the present item 420 or the present item listing 400 and the one or more similar historical item listings 500 based on keyword comparison (e.g., exact matches or inexact matches such as by fuzzy logic functions) or any other suitable functions capable of determining similarities among the present characteristics 410 and the historical characteristics 520. The similarity between the present item listing 400 and the one or more similar historical item listings 500 and similarities among the one or more similar historical item listings 500 may form an underlying relationship upon which the dynamic bidding model is established.

In operation 1120, the generation module 240 generates an expected price for the present item 420 based on the one or more similar historical item listings 500. In various example embodiments, the generation module 240 performs the operation 1120 similarly to the operation 632. For example, the generation module 240 may generate the expected price for the present item 420 using input of the closing prices 540 of the one or more historical item listings 500, the bid ranges within the bid velocity data 530 of the one or more similar historical item listings 500, and the bid velocity of the present item listing 400 as input for the dynamic bidding model, with the dynamic bidding model determining and outputting an expected closing price 540 for the present item listing 400.

In operation 1130, the determination module 230 determines a set of bidding ranges among the bid velocity data 530. In some example embodiments, the set of bid ranges have a bid velocity exceeding a velocity threshold. Operation 1130 may be performed similarly or the same as operation 630, such that the determination module 230 detects the set of bid ranges from the bid velocity data 530 based on the frequency of bids during discrete periods of time within the duration of the auction for the one or more similar historical item listings 500.

In operation 1140, the determination module 230 determines a value proximity of each bidding range of the set of bidding ranges to a closing price 540 for each historical item listing 500 of the one or more similar historical item listings 500. For example, for each similar historical item listing 500, the determination module 230 determines a value proximity between each bidding range and the closing price 540 for that similar historical item listing 500. The value proximity may be understood to be a distance between the monetary values represented by the lower bound or the upper bound of each bidding range of the set of bidding ranges and the monetary value represented by the closing price 540 for a historical item listing 500. In some example embodiments, the value proximities of the set of bidding ranges may be used by the dynamic bidding model in determining a relationship between each bidding range and the closing price 540 of a similar historical item listing 500.

In operation 1150, the determination module 230 determines a temporal proximity of each bidding range of the set of bidding ranges to a termination of each historical item listing 500 of the one or more historical item listings 500. The temporal proximity may be understood as a distance between a time of an initiating bid or a closing bid 560 of a bid range being placed and a time of the bid for the closing price 540 of a similar historical item listing 500 being placed. The temporal proximities of the set of bidding ranges may be used by the dynamic bidding model in determining a relationship between each bidding range and the closing price 540 of a similar historical item listing 500.

Figure 12:
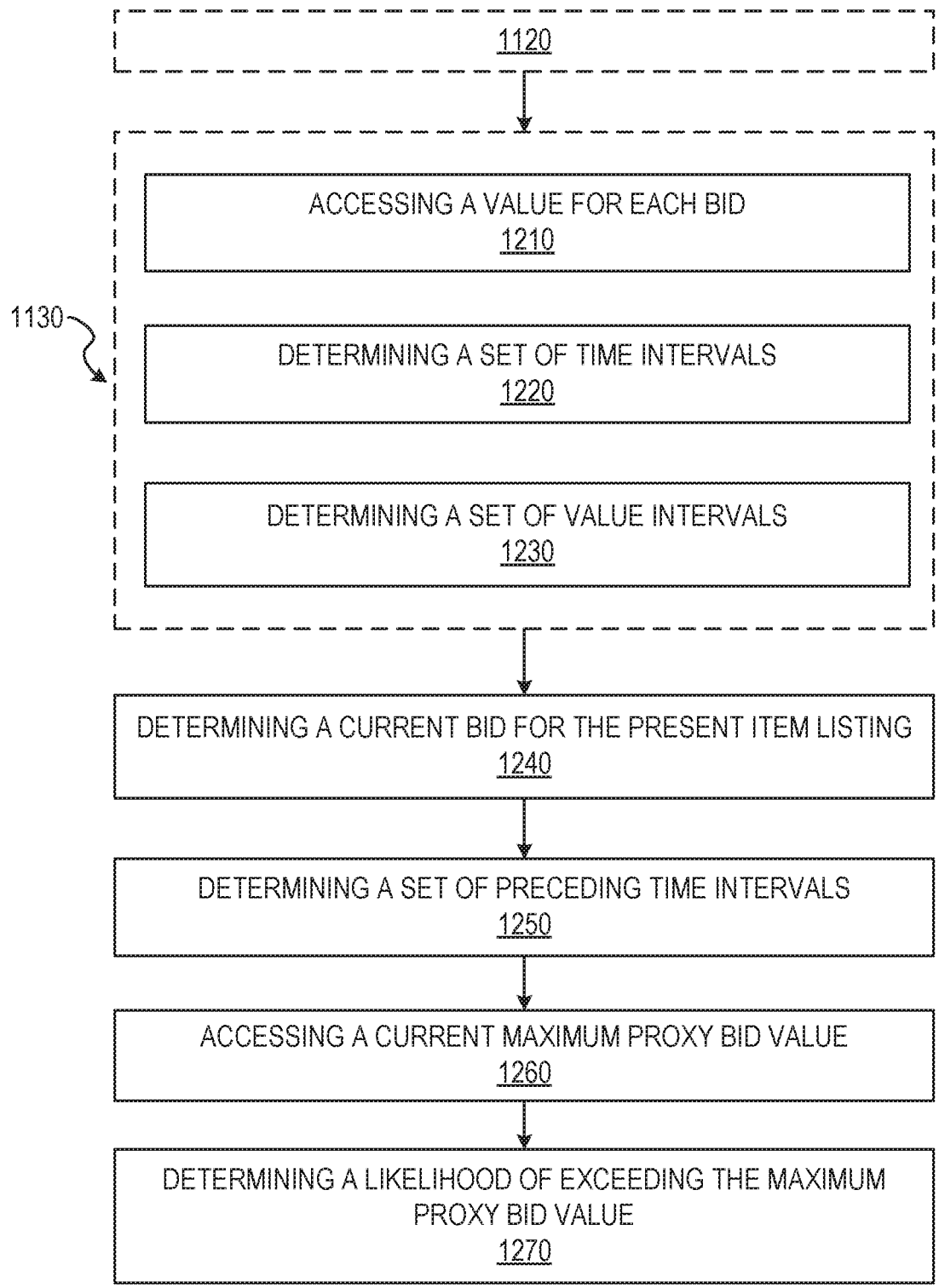
FIG. 12 is a flow chart illustrating an example method, according to various embodiments.

FIG. 12 is a flow chart depicting operations of the price guidance system 150 in performing an example embodiment of operation 1130 of the method 1000 of determining a set of bidding ranges, according to some example embodiments. The operations depicted in FIG. 12 may be performed by the price guidance system 150 using modules described above with respect to FIG. 2.

In performing operation 1130, the access module 220 may perform operation 1210. In operation 1210 the access module 220 accesses a value for each bid of the set of bids included in each bidding range of the set of bidding ranges. In some example embodiments, the access module 220 accesses the value for each bid by accessing the database 126 of the network-based publication system 142. The bid values for the bids may be stored in a data table, or any other suitable data storage format, comprising the bid velocity data 530 of the set of historical item listings 500. The access module 220 may access the bid values in cooperation with the communication module 280 via the network 104.

Further, in performing the operation 1130, the determination module 230 may perform operation 1220. In operation 1220, the determination module 230 determines a set of time intervals among the set of bids included in each bidding range. The determination module 230 may determine the time intervals by detecting elapsed time between the set of bids within the bid velocity data 530. In various example embodiments, the access module 220 may access time values associated with each bid of the bid velocity data 530 and provide the time values to the determination module 230. The determination module 230 may then compare the time values of the bids to determine the time intervals among the set of bids.

As shown in FIG. 12, the operation 1130 further comprises operation 1230. In operation 1230, the determination module 230 determines a set of value intervals among the set of bids included in each bidding range. In various example embodiments, the determination module 230 may determine the value intervals by initially detecting monetary values of the set of bids within the bid velocity data 530. In some instances, the access module 220 may access the monetary values of the set of bids, via the network 104, and provide the monetary values and the bids with which the monetary values are associated to the determination module 230. The determination module 230 compares the monetary values among the set of bids to determine the value intervals between the monetary values of the set of bids.

In various example embodiments, the method 1000 further comprises operations 1240-1270. In operation 1240, the determination module 230 determines a current bid for the present item listing 400 as being within a bidding range of the set of bidding ranges for the one or more similar historical item listings 500. In various instances, the access module 220 accesses the present item listing 400 and passes data representative of the current bid for the present item listing 400 to the determination module 230. The determination module 230 compares the current bid for the present item listing 400 to the set of bidding ranges to determine whether the current bid is within an identified bidding range.

In operation 1250, the determination module 230 determines a set of preceding time intervals among the current bid and one or more preceding bid within the bidding range of the set of bidding ranges. In various example embodiments, the access module 220 accesses bid data for the present item listing 400 and passes the bid data to the determination module 230 for generating the one or more bidding notifications. Using the bid data for the present item listing 400, the determination module 230 detects the current bid for the present item and one or more preceding bids. The determination module 230 detects time values for the one or more preceding bids and determines time intervals for the one or more preceding bids by comparing the time values.

In operation 1260, the access module 220 accesses a current maximum proxy bid value for a bidder bidding on the present item listing 400. The access module 220 may access the current maximum proxy bid value for the bidder by accessing data included within the present item listing 400, a profile of the bidder, or any other suitable storage location.

In operation 1270, the determination module 230 determines a likelihood of the bidding range exceeding the current maximum proxy bid value. In some instances, the determination module 230 determines whether the current bid and the one or more preceding bids are included within a bidding range. After determining the current bid and the one or more preceding bids are within the bidding range, the determination module 230 may determine an estimated upper value of the bidding range to determine whether the bidding range will include one or more of a proxy bid included within the one or more bidding notifications and the maximum proxy bid value. The determination module 230 may determine the likelihood of the bidding range exceeding the current maximum proxy bid value by entering the current bid for the present item listing 400, the one or more preceding bids, the set of preceding time intervals, and the current maximum proxy bid value into the dynamic bidding model. In turn, based on the one or more similar historical item listings, the dynamic bidding model may generate a likelihood score (e.g., a percentage indicating the statistical likelihood) for the likelihood that the bidding range will exceed the current maximum proxy bid value.

Figure 13:
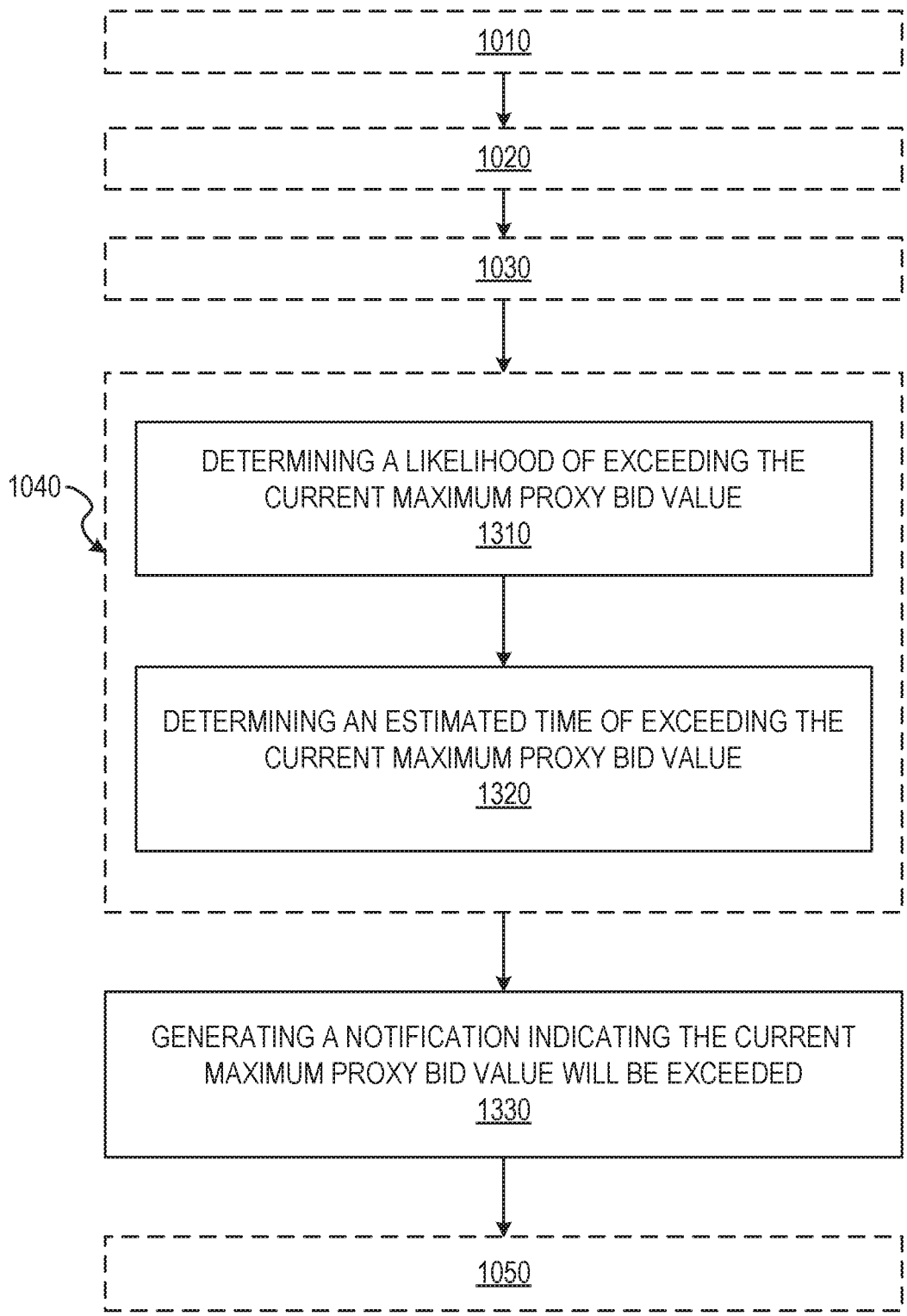
FIG. 13 is a flow chart illustrating an example method, according to various embodiments.

FIG. 13 is a flow chart of operations of the price guidance system 150 in performing the operation 1040 of generating the one or more bidding notifications. The operations depicted in FIG. 13 may be performed by the price guidance system 150 using modules described above with respect to FIG. 2.

In operation 1310, the determination module 230 determines a likelihood that the bidding range will exceed the current maximum proxy bid value. The determination module 230 may perform the operation 1310 similarly or the same as the operation 1270. The determination module 230 may determine a likelihood that the current maximum proxy bid value will be exceeded prior to or at the culmination of the bidding range and generate a system interrupt causing processing of one or more subsequent operations, described below.

In various example embodiments, the system is prompted to determine the likelihood of exceeding the current maximum proxy bid value by user actions or by system actions. For example, when the current bid on the present item listing 400 is held by a first bidder and a second bidder exceeds the current bid, the price guidance system 150 may cause the determination module 230 to determine the likelihood of exceeding the current maximum proxy bid while the bidding module 270 places a proxy bid for the first bidder. In some instances, the price guidance system 150 causes the determination module 230 to determine the likelihood of exceeding the current maximum proxy bid value where the first bidder is engaged in bidding on the present item listing 400 with one or more other bidder and the bid velocity exceeds a velocity threshold (e.g., number of bids per unit of time) or a time left on the auction for the present item listing 400 falls below a remaining time threshold.

In various example embodiments, the price guidance system 150 causes the determination module 230 to determine the likelihood of exceeding the maximum proxy bid value where bidding on the present item listing 400 is currently active and the first bidder has been inactive for at least a predetermined period of time. For example, where the price guidance system 150 detects no input (e.g., data entry on a keyboard, mouse, or touchscreen) at the client device 110 associated with the first bidder or the first bidder has terminated an active session (e.g., logged off from the network-based publication system 142 or client device 110, placed the client device 110 in a sleep or hibernation mode, etc.) and the price guidance system 150 detects a bid from the second bidder, the price guidance system 150 causes the determination module 230 to determine the likelihood of exceeding the current maximum proxy bid value.

In operation 1320, the determination module 230 determines an estimated time that the bidding range will exceed the current maximum proxy bid value. In response to determining that the likelihood of exceeding the maximum proxy bid value is above a predetermined threshold, the determination module 230 determines the estimated time for eclipsing the current maximum proxy bid value. In various example embodiments, the determination module 230 detects a current bid velocity for the present item listing 400 and the current bid on the present item listing 400. Based on the current bid velocity, the current bid, and the current maximum proxy bid value, the determination module 230 calculates one or more times at which a bid will exceed the current maximum proxy bid value. In some instances, the determination module 230 calculates multiple times based on the current bid velocity increasing, decreasing, and maintaining velocity.

In operation 1330, the generation module 240 generates a notification indicating the current maximum proxy bid value will be exceeded. In some example embodiments, the notification includes the estimated time that the bidding range will exceed the current maximum proxy bid value. The generation module 240 may generate the notification similarly or the same as the one or more bidding notifications generated in operation 1040. In some example embodiments, the notification comprises one or more data objects and processor executable instructions representative of one or more user interface elements. The notification generated in operation 1330 may be passed to the presentation module 260 for presentation at the client device 110.

Figure 14:
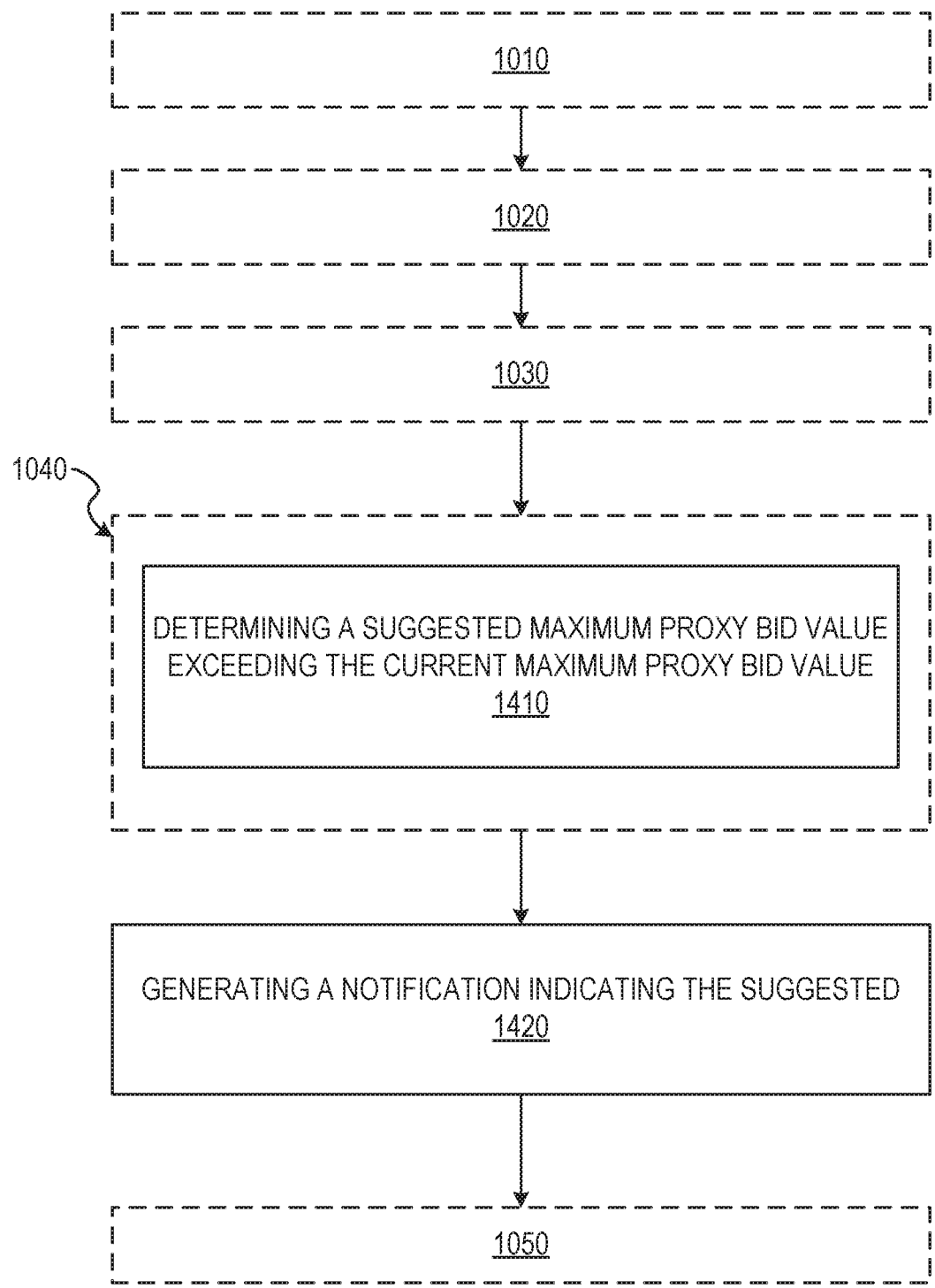
FIG. 14 is a flow chart illustrating an example method, according to various embodiments.

FIG. 14 is a flow chart of operations of the price guidance system 150 in performing the operation 1040 of generating the one or more bidding notifications. The operations depicted in FIG. 14 may be performed by the price guidance system 150 using modules described above with respect to FIG. 2.

In operation 1410, the determination module 230 determines a suggested maximum proxy bid value exceeding the current maximum proxy bid value. The suggested maximum proxy bid value based on one or more of the set of bidding ranges, the set of preceding time intervals of the current bid (e.g., the bid velocity of the present item listing 400), the set of preceding bids of the bidding range, an estimated closing price 540 of the present item listing 400, and an estimated closing bid 560 of a current bidding range (e.g., the bidding range exceeding the current maximum proxy bid value). In various example embodiments, the suggested maximum proxy bid is determined as a set of suggested maximum proxy bids (e.g., a range of suggested bids). In some instances, the suggested maximum proxy bid exceeds one or more of the estimated closing price 540 of the present item listing 400 and the estimated closing bid 560 of the current bidding range. The suggested maximum proxy bid may be determined to exceed the estimated closing price 540 or the estimated closing bid 560 by a value determined based on the bidding range, the bid velocity of the present item listing 400, and the value of the set of preceding bids. For example, where the bid velocity is high, the value of the bids (e.g., the value interval between bids) is high, and the estimated closing price 540 of the present item listing 400 has not been exceeded, the determination module 230 may determine the suggested maximum proxy bid value as significantly exceeding the current bid for the present item listing 400 but below the estimated closing price 540 of the present item listing 400, In operation 1420, the generation module 240 generates a notification indicating the suggested maximum proxy bid value, the current maximum proxy bid value, the likelihood that the bidding range will exceed the current maximum proxy bid, and the estimated time that the bidding range will exceed the current maximum proxy bid value. In some example embodiments, the suggested maximum proxy bid value is less than the expected closing price 540 of the present item 420 and exceeds the current maximum proxy bid value. In various example embodiments, the notification generated in operation 1420 may be generated similarly to the notification of operation 1330 or the one or more bidding notifications of operation 940.

Figure 15:
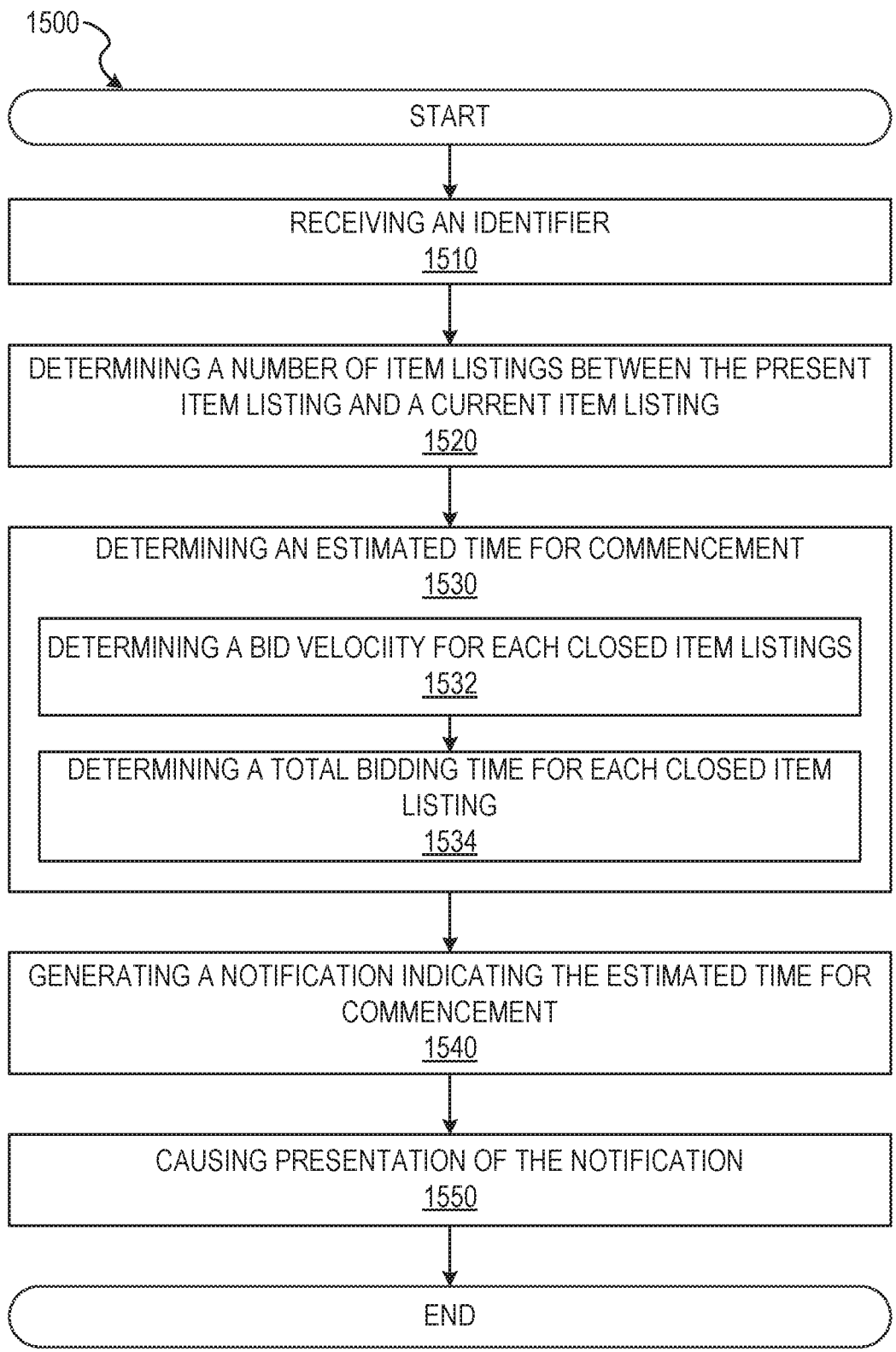
FIG. 15 is a flow chart illustrating an example method, according to various embodiments.

FIG. 15 is a flow chart of operations of the price guidance system 150 in performing a method 1500 of generating one or more bidding notifications, according to some example embodiments. Operations in the method 1500 may be performed by the price guidance system 150 using modules described with respect to FIG. 2. The method 1500 may include one or more of the operations of the method 1000, as discussed in more detail below.

The present item listing 400 is included within an ordered set of item listings in an auction. In operation 1510, the receiver module 210 receives an identifier indicative of the present item listing 400 of a set of item listings. The present item listing 400 is indicative of an item listing of the set of item listings currently up for bid in an auction. In some example embodiments, the receiver module 210 receives the identifier in cooperation with the communications module 280 via the network 104. The identifier may be received from a user 106 (e.g., a potential buyer or potential bidder) interested in the present item listing 400. In some instances, the identifier may be a portion of the present item listing 400 (e.g., a title, an item number, an SKU, etc.) or a descriptive data set representative of the present item listing 400. For example, the descriptive data set may be understood to be a query, a set of keywords, a set of the present characteristics 410, a set of category selections, or the like. In some example embodiments, the receiver module 210 receives the identifier from a separate module of the price guidance system 150. For example, the receiver module 210 may receive the identifier from the access module 220 which accesses the identifier for the present item listing 400 after receiving a selection (e.g., a mouse click selection of an auction preview) by a user 106 representing the present item listing 400.

In operation 1520, the determination module 230 determines a number of item listings between the present item listing 400 and the current item listing. In various example embodiments, the determination module 230 determines the item listings in the ordered set of item listings which precede the present item listing 400. For example, in a live auction, where the present item listing 400 is associated with a relatively high lot number, the determination module 230 detects the number of item listings with a lower lot number within the live auction.

In operation 1530, the determination module 230 determines an estimated time for commencement of bidding on the present item listing 400. The estimated time is based on a bid velocity of the current item listing 400. In some example embodiments, the determination module 230 periodically re-determines the estimated time for commencement of bidding based on bidding for the current item closing and bidding of a subsequent item commencing. Further, in some instances, the determination module 230 periodically re-determines the estimated time for commencement of bidding based on a change in the bid velocity for the current item listing. In various embodiments, the determination module 230 determines the estimated time for commencement of bidding for the present item listing 400 at the close of each item listing within the ordered set of item listings and at a point after commencement of bidding on each item listing within the ordered set of item listings. As such, in at least some instances, the determination module 230 may provide a dynamic estimated time for commencement continually adjusted based on the current item listing and representative of the bid velocity across all of the item listings preceding the current item listing.

By way of example, in some embodiments, one or more closed item listings have been closed prior to commencement of bidding on the current item listing. In these embodiments, the operation 1530 may be performed by one or more operations. As shown in FIG. 15, in operation 1532, the determination module 230 determines a bid velocity for each of the one or more closed item listings and the current item listing. The determination module 230 may determine the bid velocity for each of the closed item listings and the current item listing based on the access module 220 accessing the bid velocity data 530, where bid velocity data 530 is recorded. In various example embodiments, the determination module 230 calculates the bid velocity of the closed item listings and the current item listing based on a set of time intervals extending between bids for each of the closed item listings and the current item listing. In some instances, the determination module 230 includes a lag time extending between a final bid and closing of an item listing and commencement of a subsequent item listing.

In operation 1534, the determination module 230 determines a total bidding time for each of the one or more closed item listings. The total bidding time indicative of a time period extending between commencement of bidding and closing of bidding for a closed item listing of the one or more closed item listings.

In operation 1540, the generation module 240 generates a notification indicating the estimated time for commencement of bidding on the present item listing 400. The notification generated in operation 1540 may be generated similarly to the notification of operation 1040, 1330, or 1420. The generated notification may include one or more user interface elements indicative of the present item listing 400, a time until commencement of bidding on the present item listing 400, and one or more closed items within the ordered set of item listings of the auction. In various example embodiments, one or more of the user interface elements may include a link or other processor executable instruction which, when selected, causes the client device 110 to display the auction of the ordered set of item listings in real time.

In operation 1550, the presentation module 260 causes presentation of the notification at the client device 110 associated with the user 106 (e.g., the potential buyer or potential bidder). In some instances, the presentation module 260 causes presentation by transmitting the notification to the client device 110 via the network 104. In various example embodiments, presentation of the notification comprises a system interrupt included in processor executable instructions within the notification. The system interrupt may cause interruption of one or more processes and cause presentation of the notification or an indication of the notification. For example, where the client device 110 is a smart phone, the system interrupt may cause the client device 110 to initiate a presentation indication (e.g., a vibration, a sound, a display of the user interface element). Selection of the presentation indication causes presentation of the notification, including the link to the auction of the ordered set of item listings.

According to various example embodiments, one or more of the methodologies described herein may facilitate determining an expected value for an item listing; automated determination of a price suitable for characteristics specific to the item listing; and generating a bidding notification for a proxy bid, a suggested change to a maximum proxy bid value, and a notification to commence interaction with an ordered set of item listings for bidding on a desired listing. Methologies for generating the bidding notifications may automatically determine times and values associated with proxy bidding, maximum proxy bid values, and commencing actively participating in live auctions. In particular, one or more of the methodologies described herein may constitute at least a portion of a business method (e.g., a business method at least partially implemented by a machine) that enables one or more users 106 of a network-based system to view, interact with, and bid, purchase, or sell various items represented by item listings with accurately derived values for the items. Accordingly, one or more of the methodologies described herein may have the effect of allowing a user 106 to navigate through the selling or purchase of items for an accurately determined value. One or more of the methodologies described herein may also have the effect of allowing a user 106 to engage in other activities while systems implementing the one or more methodologies monitor and provide advanced notification of a need for proxy bidding, exceeding proxy bidding values, and advanced commencement of auctions for a desired item listing.

As a result, one or more of the methodologies described herein may obviate a need for certain efforts or resources that otherwise would be involved in research, decision-making, online shopping, and more. Efforts expended by a user 106 in identifying a selling price to offer a product based on characteristics specific to the item may be reduced and more accurately determined based on learning models of one or more of the methodologies described herein. Further, one or more of the methodologies described herein may enable automated bid monitoring, determining bid amounts, determining maximum proxy bid authorizations, and determining when an item will be up for bid within an unmonitored live auction. Efforts expended to monitor bidding and live auctions may be reduced or eliminated by one or more of the methodologies described herein. Computing resources used by one or more machines, databases 126, or devices (e.g., within the network environment) may similarly be reduced. Examples of such computing resources include processor cycles, network traffic, memory usage, data storage capacity, power consumption, and cooling capacity. Specifically, computing resources used by machines, being directed by interactions of a user 106, to monitor live auctions may be eliminated. Accuracy of estimating closing prices 540 for unique, rare, or obscure items may be increased while the user 106 and computing resources used to generate closing price estimates may be reduced.

Modules, Components, and Logic

Certain embodiments are described herein as including logic or a number of components, modules, or mechanisms. Modules constitute either purpose built hardware components in the form of a hardware module or components configured by software in the form of a hardware-software module (e.g., a hardware and software combination). A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application 114 or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations.

For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications 114 and so forth described in conjunction with FIGS. 2-15 are implemented in some embodiments in the context of a machine and an associated software architecture. In various embodiments, the modules, methods, applications 114 and so forth described above are implemented in the context of a plurality of machines, distributed across and communicating via a network 104, and one or more associated software architectures. The sections below describe representative software architecture(s) and machine hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement embodiments of the present disclosure in different contexts from the disclosure contained herein.

Software Architecture

Figure 16:
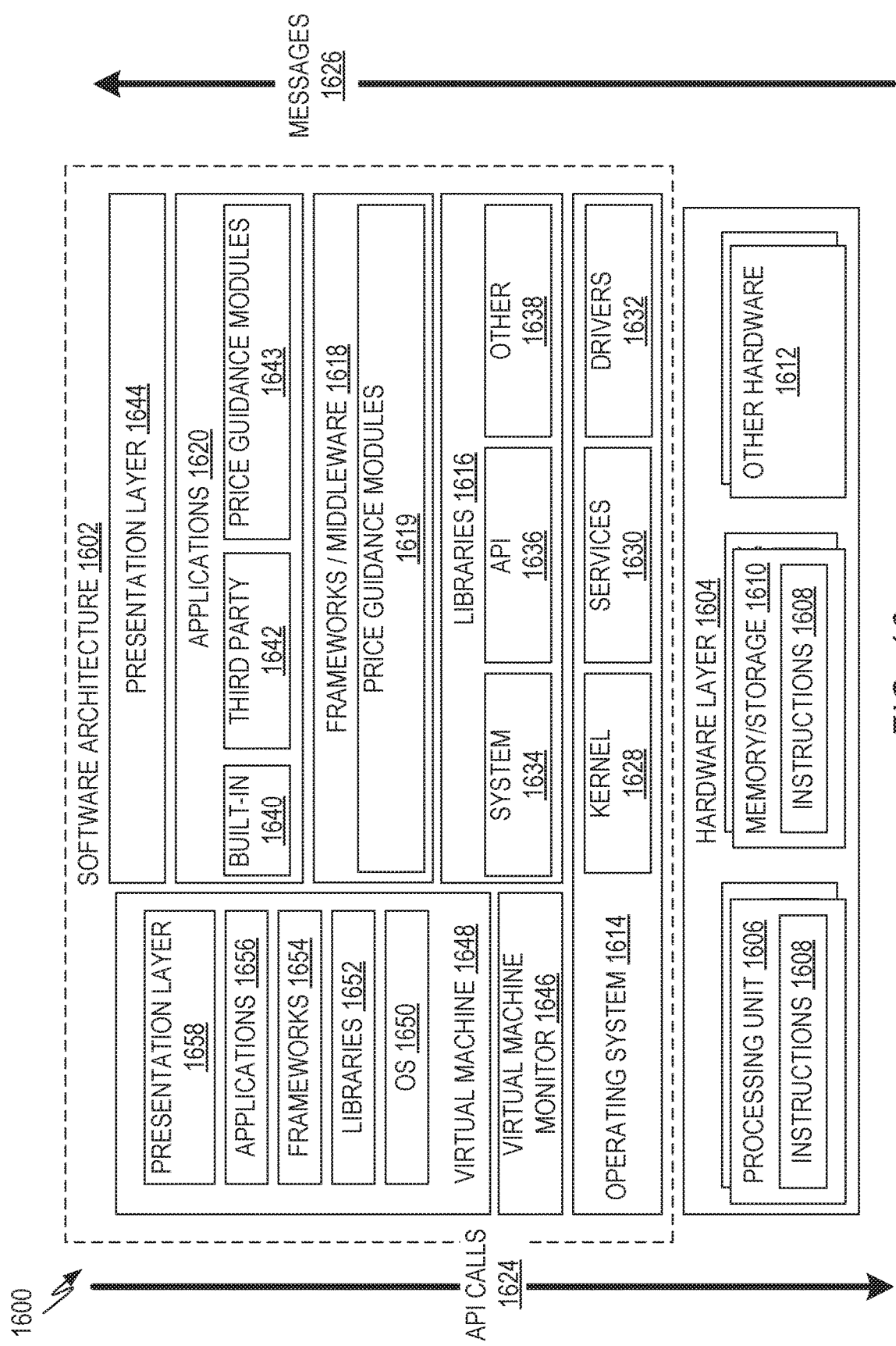
FIG. 16 is a block diagram illustrating an example of a software architecture that may be installed on a machine, according to some example embodiments.

FIG. 16 is a block diagram 1600 illustrating a representative software architecture 1602, which may be used in conjunction with various hardware architectures herein described. FIG. 16 is merely a non-limiting example of a software architecture 1602 and it will be appreciated that many other architectures may be implemented to facilitate the functionality described herein. The software architecture 1602 may be executing on hardware such as machine 1700 of FIG. 17 that includes, among other things, processors 1710, memory 1730, and I/O components 1750. A representative hardware layer 1604 is illustrated and can represent, for example, the machine 1700 of FIG. 17. The representative hardware layer 1604 comprises one or more processing units 1606 having associated executable instructions 1608. Executable instructions 1608 represent the executable instructions of the software architecture 1602, including implementation of the methods, modules and so forth of FIGS. 2-15. Hardware layer 1604 also includes memory and/or storage modules 1610, which also have executable instructions 1608. Hardware layer 1604 may also comprise other hardware as indicated by 1612 which represents any other hardware of the hardware layer 1604, such as the other hardware illustrated as part of machine 1700.

In the example architecture of FIG. 16, the software architecture 1602 may be conceptualized as a stack of layers where each layer provides particular functionality. For example, the software architecture 1602 may include layers such as an operating system 1614, libraries 1616, frameworks/middleware 1618, applications 1620 and presentation layer 1644. Operationally, the applications 1620 and/or other components within the layers may invoke application programming interface (API) calls 1624 through the software stack and receive a response, returned values, and so forth illustrated as messages 1626 in response to the API calls 1624. The layers illustrated are representative in nature and not all software architectures have all layers. For example, some mobile or special purpose operating systems may not provide a frameworks/middleware layer 1618, while others may provide such a layer. Other software architectures may include additional or different layers.

The operating system 1614 may manage hardware resources and provide common services. The operating system 1614 may include, for example, a kernel 1628, services 1630, and drivers 1632. The kernel 1628 may act as an abstraction layer between the hardware and the other software layers. For example, the kernel 1628 may be responsible for memory management, processor management (e.g., scheduling), component management, networking, security settings, and so on. The services 1630 may provide other common services for the other software layers. The drivers 1632 may be responsible for controlling or interfacing with the underlying hardware. For instance, the drivers 1632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1616 may provide a common infrastructure that may be utilized by the applications 1620 and/or other components and/or layers. The libraries 1616 typically provide functionality that allows other modules to perform tasks in an easier fashion than to interface directly with the underlying operating system 1614 functionality (e.g., kernel 1628, services 1630 and/or drivers 1632). The libraries 1616 may include system 1634 libraries (e.g., C standard library) that may provide functions such as memory allocation functions, string manipulation functions, mathematic functions, and the like. In addition, the libraries 1616 may include API libraries 1636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1616 may also include a wide variety of other libraries 1638 to provide many other APIs to the applications 1620 and other software components/modules.

The frameworks 1618 (also sometimes referred to as middleware) may provide a higher-level common infrastructure that may be utilized by the applications 1620 and/or other software components/modules. For example, the frameworks 1618 may provide various graphic user interface (GUI) functions, high-level resource management, high-level location services, and so forth. The frameworks 1618 may provide a broad spectrum of other APIs that may be utilized by the applications 1620 and/or other software components/modules, some of which may be specific to a particular operating system 1614 or platform. In some example embodiments price guidance modules 1619 (e.g., one or more modules of the price guidance system 150) may be implemented, at least in part, within the middleware/frameworks 1618. For example, in some instances, at least a portion of the presentation module 260, providing graphic and non-graphic user interface functions, may be implemented in the middleware/frameworks 1618. Similarly, in some example embodiments, portions of one or more of the receiver module 210, the access module 220, the determination module 230, and the generation module 240 may be implemented in the middleware/frameworks 1618.

The applications 1620 include built-in applications 1640, third party applications 1642, and/or price guidance modules 1643 (e.g., user facing portions of one or more of the modules of the price guidance system 150). Examples of representative built-in applications 1640 may include, but are not limited to, a contacts application, a browser application, a book reader application, a location application, a media application, a messaging application, and/or a game application. Third party applications 1642 may include any of the built in applications as well as a broad assortment of other applications. In a specific example, the third party application 1642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1642 may invoke the API calls 1624 provided by the mobile operating system such as operating system 1614 to facilitate functionality described herein. In various example embodiments, the user facing portions of the price guidance modules 1643 may include one or more modules or portions of modules described with respect to FIG. 2. For example, in some instances, portions of the receiver module 210, the selection module 250, the presentation module 260, and the bidding module 270 associated with user interface elements (e.g., data entry and data output functions) may be implemented in the form of an application of the price guidance modules 1643.

The applications 1620 may utilize built in operating system functions (e.g., kernel 1628, services 1630 and/or drivers 1632), libraries 1616 (e.g., system 1634, APIs 1636, and other libraries 1638), frameworks/middleware 1618 to create user interfaces to interact with users 106 of the system. Alternatively, or additionally, in some systems, interactions with a user 106 may occur through a presentation layer, such as presentation layer 1644. In these systems, the application/module "logic" can be separated from the aspects of the application/module that interact with a user 106.

Some software architectures utilize virtual machines. In the example of FIG. 16, this is illustrated by virtual machine 1648. A virtual machine creates a software environment where applications/modules can execute as if they were executing on a hardware machine (such as the machine 1700 of FIG. 17, for example). A virtual machine 1648 is hosted by a host operating system (operating system 1614 in FIG. 16) and typically, although not always, has a virtual machine monitor 1646, which manages the operation of the virtual machine 1648 as well as the interface with the host operating system (i.e., operating system 1614). A software architecture executes within the virtual machine 1648 such as an operating system 1650, libraries 1652, frameworks/middleware 1654, applications 1656 and/or presentation layer 1658. These layers of software architecture 1602 executing within the virtual machine 1648 can be the same as corresponding layers previously described or may be different.

Example Machine Architecture and Machine-Readable Medium

Figure 17:
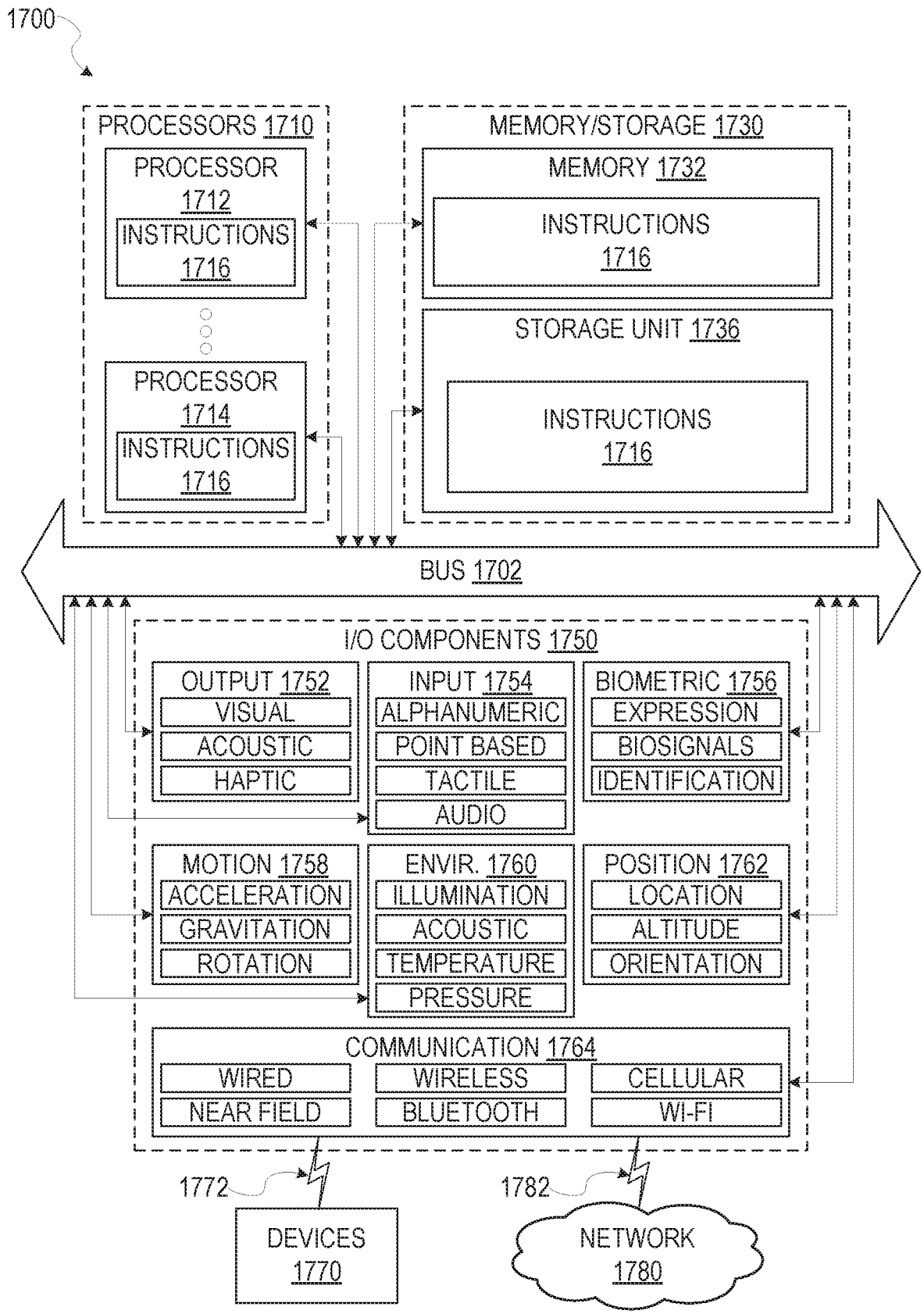
FIG. 17 illustrates a diagrammatic representation of a machine in the form of a computer system within which a set of instructions may be executed for causing the machine to perform any one or more of the methodologies discussed herein, according to an example embodiment.

FIG. 17 is a block diagram illustrating components of a machine 1700, according to some example embodiments, able to read instructions (e.g., processor executable instructions 1608) from a machine-readable medium (e.g., a non-transitory machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. For example the instructions 1716 may cause the machine 1700 to execute the flow diagrams of FIGS. 3 and 6-15. Additionally, or alternatively, the instructions 1716 may implement the receiver module 210, the access module 220, the determination module 230, the generation module 240, the selection module 250, the presentation module 260, and the bidding module 270 of FIGS. 2-3 and 6-15, and so forth. The instructions 1716 transform the general, non-programmed machine 1700 into a particular machine programmed to carry out the described and illustrated functions in the manner described.

In alternative embodiments, the machine 1700 operates as a standalone device or may be coupled (e.g., networked) to other machines in a networked system. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), an entertainment media system, a web appliance, a network router, a network switch, a network bridge, or any machine capable of executing the instructions 1716, sequentially or otherwise, that specify actions to be taken by machine 1700. In some example embodiments, in the networked deployment, one or more machines may implement at least a portion of the modules described above. The one or more machines interacting with the machine 1700 may comprise, but not be limited to a personal digital assistant (PDA), an entertainment media system, a cellular telephone, a smart phone, a mobile device, a wearable device (e.g., a smart watch), a smart home device (e.g., a smart appliance), and other smart devices. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory 1730, and I/O components 1750, which may be configured to communicate with each other such as via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1712 and processor 1714 that may execute instructions 1716. The term "processor" is intended to include multi-core processor 1710 that may comprise two or more independent processors 1710 (sometimes referred to as "cores") that may execute instructions 1716 contemporaneously. Although FIG. 17 shows multiple processors 1710, the machine 1700 may include a single processor 1710 with a single core, a single processor 1710 with multiple cores (e.g., a multi-core processor 1710), multiple processors 1710 with a single core, multiple processors 1710 with multiples cores, or any combination thereof.

The memory/storage 1730 may include a memory 1732, such as a main memory, or other memory storage, and a storage unit 1736, both accessible to the processors 1710 such as via the bus 1702. The storage unit 1736 and memory 1732 store the instructions 1716 embodying any one or more of the methodologies or functions described herein. The instructions 1716 may also reside, completely or partially, within the memory 1732, within the storage unit 1736, within at least one of the processors 1710 (e.g., within the processor 1710's cache memory), or any suitable combination thereof, during execution thereof by the machine 1700. Accordingly, the memory 1732, the storage unit 1736, and the memory of processors 1710 are examples of machine-readable media.

As used herein, "machine-readable medium" means a device able to store instructions 1710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1716. The term "machine-readable medium" shall also be taken to include any medium, or combination of multiple media, that is capable of storing instructions (e.g., instructions 1716) for execution by a machine (e.g., machine 1700), such that the instructions 1716, when executed by one or more processors of the machine 1700 (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1750 may include a wide variety of components to receive input, provide output, produce output, transmit information, exchange information, capture measurements, and so on. The specific I/O components 1750 that are included in a particular machine 1700 will depend on the type of machine 1700. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environmental components 1760, or position components 1762 among a wide array of other components. For example, the biometric components 1756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 may include acceleration sensor components (e.g., accelerometer), gravitation sensor components, rotation sensor components (e.g., gyroscope), and so forth. The environmental components 1760 may include, for example, illumination sensor components photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via coupling 1782 and coupling 1772 respectively. For example, the communication components 1764 may include a network interface component or other suitable device to interface with the network 1780. In further examples, communication components 1764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., a peripheral device coupled via a Universal Serial Bus (USB)).

Moreover, the communication components 1764 may detect identifiers or include components operable to detect identifiers. For example, the communication components 1764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network and the coupling 1782 may be a Code Division Multiple Access (CDMA) connection, a Global System for Mobile communications (GSM) connection, or other type of cellular or wireless coupling. In this example, the coupling 1782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., hypertext transfer protocol (HTTP)). Similarly, the instructions 1716 may be transmitted or received using a transmission medium via the coupling 1772 (e.g., a peer-to-peer coupling) to devices 1770. The term "transmission medium" shall be taken to include any intangible medium that is capable of storing, encoding, or carrying instructions 1716 for execution by the machine 1700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
    receiving a selection of a present item listing, the present item listing including a set of present characteristics describing the present item, the selection representing interaction with a user interface element associated with the present item listing and within a graphical user interface;
    accessing, by at least one processor of a machine, historical auction data for a set of historical item listings stored on a database, each historical item listing of the set of historical item listings having a set of bid velocity data;
    generating, by at least one processor of the machine, a dynamic bidding model for bidding on the present item based on the set of historical item listings;
    generating one or more bidding notifications based on the dynamic bidding model, the one or more bidding notifications comprising a set of user interface elements, a first portion of the set of user interface elements presenting a portion of the present item listing and a second portion of the set of user interface elements configured to enable interaction with the present item listing based on the dynamic bidding model; and
    causing presentation of the one or more bidding notifications on a client device, the one or more bidding notifications presented with the set of user interface elements, the second portion of the set of user interface elements being selectable by a user within the graphical user interface on the client device.

2. The method of claim 1, wherein the generating the dynamic bidding model further comprises:
    determining a similarity between the present item and one or more historical listings of the set of historical item listings;
    generating an expected price for the present item based on the one or more historical item listings;
    determining a set of bidding ranges among the bid velocity data, the set of bidding ranges having a bid velocity exceeding a velocity threshold;
    determining a value proximity of each bidding range of the set of bidding ranges to a closing price for each historical item listing of the one or more historical item listings; and
    determining a temporal proximity of each bidding range of the set of bidding ranges to a termination of each historical item listing of the one or more historical item listings.

3. The method of claim 2, wherein the determining the set of bidding ranges further comprises:
    accessing a value for each bid of a set of bids included in each bidding range of the set of bidding ranges;
    determining a set of time intervals among the set of bids included in each bidding range; and
    determining a set of value intervals among the set of bids included in each bidding range.

4. The method of claim 2, wherein the generating the one or more bidding notifications further comprises:
    determining a current bid on the present item listing as being within a bidding range of the set of bidding ranges;
    determining a set of preceding time intervals among the current bid and one or more preceding bid within the bidding range of the set of bidding ranges;
    accessing a current maximum proxy bid value for a bidder bidding on the present item listing; and
    determining a likelihood of the bidding range exceeding the current maximum proxy bid value.

5. The method of claim 4, wherein generating the one or more bidding notifications further comprises:
    entering a proxy bid within the current maximum proxy bid value for the present item listing, the proxy bid exceeding the current bid on the present item listing; and
    generating a notification indicating the proxy bid is being entered for the present item listing.

6. The method of claim 4, wherein the generating the one or more bidding notifications further comprises:
    determining a likelihood that the bidding range will exceed the current maximum proxy bid value;
    determining an estimated time that the bidding range will exceed the current maximum proxy bid value; and
    generating a notification indicating the current maximum proxy bid value will be exceeded, the notification including the estimated time that the bidding range will exceed the current maximum proxy bid value.

7. The method of claim 6, wherein the generating the one or more bidding notifications further comprises:
 determining a suggested maximum proxy bid value exceeding the current maximum proxy bid value, the suggested maximum proxy bid value based on the set of bidding ranges, the set of preceding time intervals of the current bid and the set of preceding bids of the bidding range; and
 generating a notification indicating the suggested maximum proxy bid value, the current maximum proxy bid value, the likelihood that the bidding range will exceed the current maximum proxy bid, and the estimated time that the bidding range will exceed the current maximum proxy bid value.

8. A system, comprising:
 hardware processing circuitry;
 one or more hardware memories storing instructions that when executed configure the hardware processing circuitry to perform operations comprising:
  receiving a selection of a present item listing, the present item listing including a set of present characteristics describing the present item, the selection representing interaction with a user interface element associated with the present item listing and within a graphical user interface;
  accessing, by at least one processor of a machine, historical auction data for a set of historical item listings stored on a database, each historical item listing of the set of historical item listings having a set of bid velocity data;
  generating, by at least one processor of the machine, a dynamic bidding model for bidding on the present item based on the set of historical item listings;
  generating one or more bidding notifications based on the dynamic bidding model, the one or more bidding notifications comprising a set of user interface elements, a first portion of the set of user interface elements presenting a portion of the present item listing and a second portion of the set of user interface elements configured to enable interaction with the present item listing based on the dynamic bidding model; and
  causing presentation of the one or more bidding notifications on a client device, the one or more bidding notifications presented with the set of user interface elements, the second portion of the set of user interface elements being selectable by a user within the graphical user interface on the client device.

9. The system of claim 8, wherein the generating the dynamic bidding model further comprises:
 determining a similarity between the present item and one or more historical listings of the set of historical item listings;
 generating an expected price for the present item based on the one or more historical item listings;
 determining a set of bidding ranges among the bid velocity data, the set of bidding ranges having a bid velocity exceeding a velocity threshold;
 determining a value proximity of each bidding range of the set of bidding ranges to a closing price for each historical item listing of the one or more historical item listings; and
 determining a temporal proximity of each bidding range of the set of bidding ranges to a termination of each historical item listing of the one or more historical item listings.

10. The system of claim 9, wherein the determining the set of bidding ranges further comprises:
 accessing a value for each bid of a set of bids included in each bidding range of the set of bidding ranges;
 determining a set of time intervals among the set of bids included in each bidding range; and
 determining a set of value intervals among the set of bids included in each bidding range.

11. The system of claim 9, wherein the generating the one or more bidding notifications further comprises:
 determining a current bid on the present listing as being within a bidding range of the set of bidding ranges;
 determining a set of preceding time intervals among the current bid and one or more preceding bid within the bidding range of the set of bidding ranges;
 accessing a current maximum proxy bid value for a bidder bidding on the present item listing; and
 determining a likelihood of the bidding range exceeding the current maximum proxy bid value.

12. The system of claim 11, wherein the generating the one or more bidding notifications further comprises:
 entering a proxy bid within the current maximum proxy bid value for the present item listing, the proxy bid exceeding the current bid on the present item listing; and
 generating a notification indicating the proxy bid is being entered for the present item listing.

13. The system of claim 11, wherein the generating the one or more bidding notifications further comprises:
 determining a likelihood that the bidding range will exceed the current maximum proxy bid value;
 determining an estimated time that the bidding range will exceed the current maximum proxy bid value; and
 generating a notification indicating the current maximum proxy bid value will be exceeded, the notification including the estimated time that the bidding range will exceed the current maximum proxy bid value.

14. The system of claim 13, wherein the generating the one or more bidding notifications further comprises:
 determining a suggested maximum proxy bid value exceeding the current maximum proxy bid value, the suggested maximum proxy bid value based on the set of bidding ranges, the set of preceding time intervals of the current bid and the set of preceding bids of the bidding range; and
 generating a notification indicating the suggested maximum proxy bid value, the current maximum proxy bid value, the likelihood that the bidding range will exceed the current maximum proxy bid, and the estimated time that the bidding range will exceed the current maximum proxy bid value.

15. The system of claim 14, wherein the suggested maximum proxy bid value is less than an expected closing price for the present item and exceeds the current maximum proxy bid value.

16. The system of claim 10, wherein the present item listing is included within an ordered set of item listings in an auction and the system further comprising:
 receiving an identifier indicative of a current item listing of the set of item listings, the current item listing indicative of an item listing of the set of item listings currently up for bid in the auction;

determining a number of item listings between the present item listing and the current item listing;

determining an estimated time for commencement of bidding on the present item listing, the estimated time based on a bid velocity of the current item listing; and generating a notification indicating the estimated time for commencement of bidding on the present item listing.

17. The system of claim 16, wherein one or more closed item listings have been closed prior to commencement of bidding on the current item listing, and the determining the estimated time further comprises:

determining a bid velocity for each of the one or more closed item listings and the current item listing; and determining a total bidding time for each of the one or more closed item listings, the total bidding time indicative of a time period extending between commencement of bidding and closing of bidding for a closed item listing of the one or more closed item listings.

18. The system of claim 8, wherein the historical auction data includes a set of auction characteristics for each historical item listing of the set of historical item listings.

19. A machine-readable storage medium having no transitory signals and storing processor executable instructions that, when executed by a hardware processor of a machine, cause the machine to perform operations comprising:

receiving a selection of a present item listing, the present item listing including a set of present characteristics describing the present item, the selection representing interaction with a user interface element associated with the present item listing and within a graphical user interface;

accessing, by at least one processor of a machine, historical auction data for a set of historical item listings stored on a database, each historical item listing of the set of historical item listings having a set of bid velocity data;

generating, by at least one processor of the machine, a dynamic bidding model for bidding on the present item based on the set of historical item listings;

generating one or more bidding notifications based on the dynamic bidding model, the one or more bidding notifications comprising a set of user interface elements, a first portion of the set of user interface elements presenting a portion of the present item listing and a second portion of the set of user interface elements configured to enable interaction with the present item listing based on the dynamic bidding model; and causing presentation of the one or more bidding notifications on a client device, the one or more bidding notifications presented with the set of user interface elements, the second portion of the set of user interface elements being selectable by a user within the graphical user interface on the client device.

20. The machine readable storage medium of claim 19, wherein the generating the dynamic bidding model further comprises:

determining a similarity between the present item and one or more historical listings of the set of historical item listings;

generating an expected price for the present item based on the one or more historical item listings;

determining a set of bidding ranges among the bid velocity data, the set of bidding ranges having a bid velocity exceeding a velocity threshold;

determining a value proximity of each bidding range of the set of bidding ranges to a closing price for each historical item listing of the one or more historical item listings; and determining a temporal proximity of each bidding range of the set of bidding ranges to a termination of each historical item listing of the one or more historical item listings.

\* \* \* \* \*